(12) United States Patent
Ishikawa

(10) Patent No.: US 7,012,745 B2
(45) Date of Patent: Mar. 14, 2006

(54) COMMUNICATION TERMINAL DEVICE AND LENS ADAPTER

(75) Inventor: Masaru Ishikawa, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 716 days.

(21) Appl. No.: 09/941,163

(22) Filed: Aug. 29, 2001

(65) Prior Publication Data

US 2002/0032043 A1    Mar. 14, 2002

(30) Foreign Application Priority Data

Sep. 1, 2000    (JP) .............................. 2000-265729

(51) Int. Cl.
    *G02B 27/22*    (2006.01)
(52) U.S. Cl. ..................... 359/462; 359/811; 359/819; 348/51; 345/32; 349/15
(58) Field of Classification Search .............. 359/626, 359/619, 620–622, 462, 477, 478, 811, 818, 359/819; 345/31, 32, 7; 348/14.02, 44, 348/51, 54; 349/15, 31, 32
See application file for complete search history.

(56) References Cited

U.S. PATENT DOCUMENTS

| 5,500,765 A | * | 3/1996 | Eichenlaub | ................. 359/463 |
| 5,650,876 A | * | 7/1997 | Davies et al. | ............... 359/622 |
| 6,389,268 B1 | * | 5/2002 | Snyder | ..................... 455/90.1 |

FOREIGN PATENT DOCUMENTS

| EP | 0 773 462 | 5/1997 |
| EP | 0 883 486 | 4/1998 |
| GB | 1 484 602 | 9/1977 |
| JP | 09-197343 | 7/1997 |

* cited by examiner

*Primary Examiner*—Hung Xuan Dang
*Assistant Examiner*—Joseph Martinez
(74) *Attorney, Agent, or Firm*—Drinker Biddle & Reath LLP

(57) ABSTRACT

The display unit displays two-dimensional picture. When the panel unit is at the first position, the microlens unit confronts the display unit with the spacing substantially equal to the focal length of the microlens unit. Therefore, the two-dimensional picture is visualized as a pseudo-stereoscopic picture. On the other hand, when the panel unit is at the second position, the microlens unit does not confront the display unit, and hence a user can directly see the two-dimensional picture on the display unit.

4 Claims, 25 Drawing Sheets

COMMUNICATION TERMINAL DEVICE AND LENS ADAPTER

BACKGROUND OF THE INVENTION

1. Field of the Invention

This invention relates to a communication terminal device and a lens adapter to be used in a general-use communication terminal device.

2. Description of Related Art

Nowadays, communication terminal devices, especially portable telephones (cellular phones) are widespread, and the diffusion of those portable telephones is larger than the fixed telephones. Particularly, recent portable telephones have not only the basic functions to directly talk to the speaker or enjoy taking, but also the function to send the message in the form of character information and/or to display information uploaded on the internet (e.g., the game, the movies or concerts showing) Further, some portable telephones can display character pictures such as animations or photos of idols on its display unit, thereby giving the user pleasure at the time of phone call.

However, the conventional portable telephones display such pictures in a two-dimensional manner on the display unit of a color LCD (Liquid Crystal Display) or an organic EL (ElectroLuminescence) panel, and hence it is difficult to give pleasure or enjoyable feeling to the user by its display manner.

SUMMARY OF THE INVENTION

It is an object of the present invention to provide a communication terminal device capable of visualizing pictures displayed on a display unit in a pseudo-stereoscopic manner, thereby to give users pleasure or enjoyable feeling.

It is another object of the present invention to provide a lens adapter to be used with a general-use communication terminal device to enable the above pseudo-stereoscopic display.

According to one aspect of the present invention, there is provided a communication terminal device including: a display unit for displaying two-dimensional picture; a microlens unit including a pair of microlens arrays; a panel unit for supporting the microlens unit and being movable between a first position at which the microlens unit confronts the display unit with a spacing substantially equal to a focal length of the microlens unit and a second position at which the microlens unit does not confront the display unit.

In accordance with the communication device, the display unit displays two-dimensional picture. When the panel unit is at the first position, the microlens unit confronts the display unit with the spacing substantially equal to the focal length of the microlens unit. Therefore, the two-dimensional picture is visualized as a pseudo-stereoscopic picture. On the other hand, when the panel unit is at the second position, the microlens unit does not confront the display unit, and hence a user can directly see the two-dimensional picture on the display unit.

The panel unit may cover at least a part of an operation unit provided on the communication terminal device when the panel unit is at the first position.

The panel unit may be supported by the communication terminal device in such a manner that the panel unit can be opened and closed, and at least one of an operation unit and a microphone may be arranged on an inner face of the communication terminal device.

According to another aspect of the present invention, there is provided a communication terminal device including: a display unit for displaying two-dimensional picture; a microlens unit including a pair of microlens arrays and positioned to confront the display unit; a screen; and a panel unit for supporting the screen and being movable between a first position at which the screen confronts a face of the microlens unit on the opposite side of the display unit and a second position at which the screen does not confront the display unit.

In accordance with the communication terminal device, the display unit displays the two-dimensional picture. The panel unit supporting the screen is movable between the first position and the second position. When the screen is at the first position, the screen confronts the display unit and shows the two-dimensional picture projected on the screen to the user. On the other hand, when the screen is at the second position, the screen does not confront the display unit, and hence the microlens unit visualizes the two-dimensional picture displayed on the display unit as a pseudo-stereoscopic picture.

The panel unit may cover at least a part of an operation unit provided on the communication terminal device when the panel unit is at the second position.

According to still another aspect of the present invention, there is provided a communication terminal device including: a display unit for displaying two-dimensional picture; a microlens unit including a pair of microlens arrays and positioned to confront the display unit; a drive unit for moving the microlens unit with respect to the display unit to establish a first state in which the microlens unit and the display unit are remote from each other by a focal length of the microlens unit and a second state in which microlens unit and the display unit are in close contact with each other.

In accordance with the communication terminal device, the display unit displays the two-dimensional picture. When the microlens unit is in the first state, the microlens unit and the display unit are remote from each other by the focal length, so the microlens unit visualizes the two-dimensional picture on the display unit as a pseudo-stereoscopic picture. On the other hand, when the microlens unit is in the second state, the microlens unit and the display unit are in close contact with each other, and hence the two-dimensional picture on the display unit is shown to the user as it is.

The communication terminal device may further include a panel unit movable between a first position at which the panel unit covers at least a part of an operation unit provided on the communication terminal device and a second position at which the panel unit does not cover the operation unit. The drive unit may move the microlens unit with respect to the display unit to change the microlens unit and the display unit from the first state to the second state according to a movement of the panel unit from the first position to the second position.

The communication terminal device further including a screen positioned in front of a face, opposite to the display unit, of the microlens unit in the first state with a spacing smaller than the focal length.

According to still another aspect of the present invention, there is provided a communication terminal device including: a display unit for displaying two-dimensional picture; a microlens unit including a pair of microlens arrays; a screen positioned to confront a face of the microlens unit on the opposite side of the display unit; and a drive unit for moving the microlens unit with respect to the display unit to establish a first state, in which the microlens unit is remote from the display unit by a focal length of the microlens unit and an image forming plane of the microlens unit is positioned over the screen in the first position, and a second state, in which the microlens unit is positioned at a middle of the display unit and the screen.

In accordance with the communication terminal device, the display unit displays the two-dimensional picture. The drive unit moves the microlens unit with respect to the display unit between the first state and the second state. In the first state, the microlens unit is remote from the display unit by the focal length and the image formation plane of the microlens unit is positioned over the screen. Therefore, the two-dimensional picture on the display unit is visualized as a pseudo-stereoscopic picture. On the other hand, in the second state, the microlens unit is positioned at the middle of the display unit and the screen. Therefore, the two-dimensional picture is projected on the screen.

The communication terminal device may further include a panel unit movable between a first position at which the panel unit covers at least a part of an operation unit provided on the communication terminal device and a second position at which the panel unit does not cover the operation unit, wherein the drive unit moves the microlens unit to be close to the display unit to change the microlens unit and the display unit from the first state to the second state according to a movement of the panel unit from the first position to the second position.

According to still another aspect of the present invention, there is provided a lens adapter including: an attachment unit for detachably attaching the lens adapter to a communication terminal device having a display unit for displaying two-dimensional picture; and a microlens unit including a pair of microlens arrays and positioned to confront the display unit with a spacing substantially equal to a focal length of the microlens unit when the lens adapter is attached to the communication terminal device.

In accordance with the lens adapter, the lens adapter may be attached to the communication terminal device by the attachment unit in a detachable manner. The communication terminal device has the display unit which displays two-dimensional picture. When the lens adapter is attached to the communication terminal device, the microlens unit confronts the display unit with the spacing of the focal length, and hence the microlens unit visualizes the two-dimensional picture on the display unit as a pseudo-stereoscopic picture.

The lens adapter may further include a panel unit for supporting the microlens unit and being movable between a first position at which the microlens unit confronts the display unit and a second position at which the microlens unit does not confront the display unit.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

The embodiments of the present invention are directed to the portable telephone and the lens adapter which visualize the two-dimensional character picture (e.g., moving picture of game, animation or still picture of idol) in a pseudo-stereoscopic manner.

[1st Embodiment]

Figure 1:
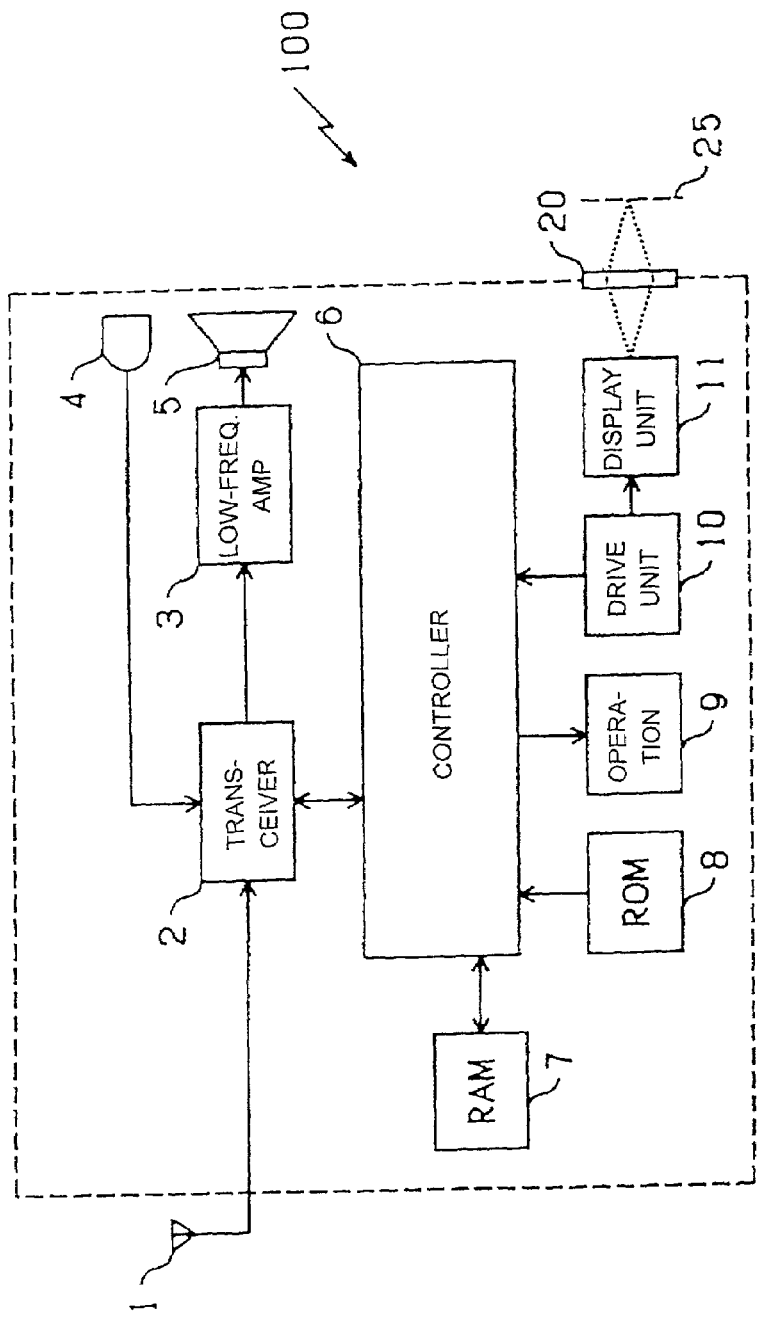
FIG. 1 is a block diagram showing a configuration of a portable telephone according to embodiments of the present invention.

The portable telephone 100 according to the first embodiment of the present invention has the circuit configured as shown in the block diagram of FIG. 1. The configuration of the circuit of the portable telephone 100 will be described below with reference to FIG. 1.

The portable telephone 100 includes an antenna 1, a transceiver unit 2 for receiving the radio wave from relay stations and transmitting the radio wave to the relay stations, a low-frequency amplifier 3 for amplifying a demodulated signal, a microphone 4 for collecting voices of a user, a speaker 5 for outputting voices, a controller 6 for the total control of the portable telephone 100, a RAM (Random Access Memory) 7 for storing telephone numbers and character pictures, a ROM (Read Only Memory) 8 for storing operation programs, an operation unit 9 which the user operates for making telephone call or registering the character pictures, a display unit 11, a drive circuit 10 for driving the display unit 11, and a microlens unit 20 for visualizing the character pictures displayed on the display unit 11 in a pseudo-stereoscopic manner.

Figure 2:
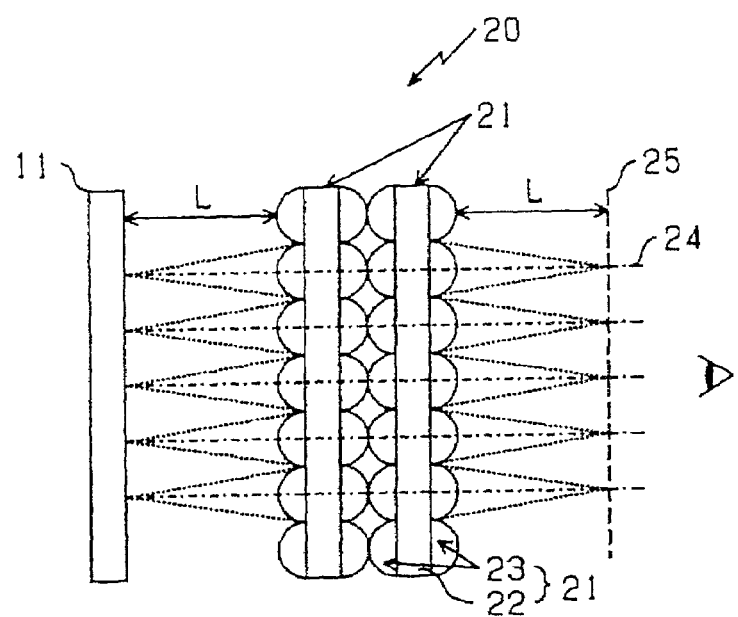
FIG. 2 is a side view of a microlens unit used in the present invention.
Figure 3:
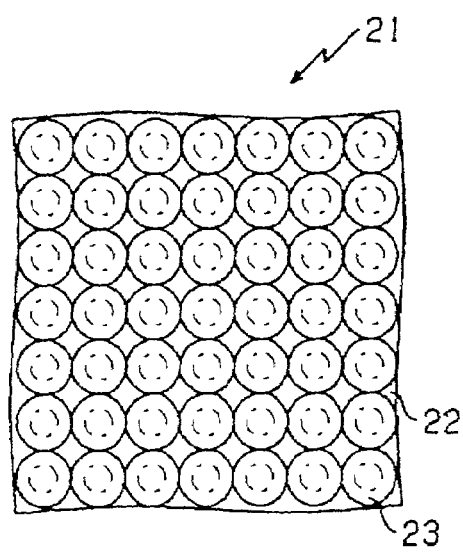
FIG. 3 is a plan view of the microlens unit used in the present invention.
Figure 4:
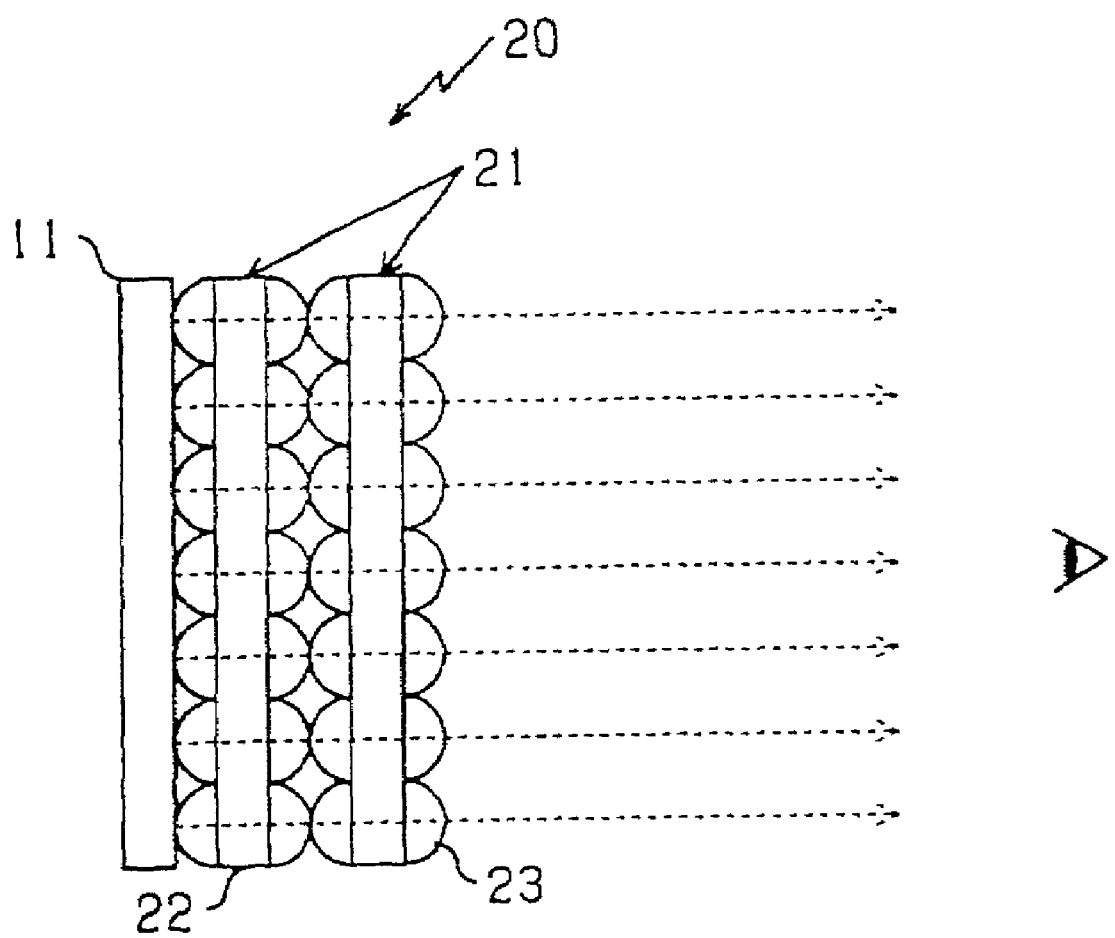
FIG. 4 is an explanatory diagram illustrating picture display method when the microlens unit is in close contact with a display unit.

Next, the configuration of the microlens unit 20 will be described with reference to FIGS. 2 to 4. The microlens unit 20 has two microlens arrays 21 having the same configuration. As shown in FIGS. 2 and 3, the microlens array 21 includes a transparent substrate 22 made by glass or acrylic plate having high translucent property, and a plurality of micro-convex lenses 23 having the same radius of curvature and being arranged in alignment with each other in a matrix manner on both sides of the transparent substrate 22. The optical axes 24 of the micro-convex lenses arranged on both sides of the substrate 22 coincide with each other. Two microlens arrays 21 are positioned side by side in such a manner that the optical axes 24 of the micro-convex lenses 23 on each lens array 21 coincide with each other. The microlens unit 20 is configured in this fashion.

When the microlens unit 20 is positioned in front of the display unit 11 in a manner being parallel with the front face of the display unit 11 and with the spacing L nearly equal to the focal length of the convex lens 23, the microlens unit 20 projects the picture displayed on the display unit 11 on an imaginary image formation plane 25 remote from the microlens unit 20 by the spacing nearly equal to the focal length L on the opposite side of the display unit 11 (on the right side in FIG. 2). While the picture thus projected is a two-dimensional picture, if the picture has depth component (i.e., stereoscopic or three-dimensional), the picture is visualized in a manner floating on the space and is seen by the user as stereoscopic picture. Hereinafter, the two-dimensional picture visualized on the imaginary image formation plane 25 will be referred to as "pseudo-stereoscopic picture".

It is noted that the two-dimensional picture displayed on the display unit 11 is inverted by one microlens array 21 when passing therethrough, and is again inverted by the other microlens array 21 when passing therethrough. So, it is seen at the imaginary image formation plane 25 in a normal manner.

As described above, when positioned in front of the display unit 11 with the spacing nearly equal to its focal length, the microlens unit 20 visualizes the two-dimensional picture displayed on the display unit 11 on the imaginary image formation plate 25 as pseudo-stereoscopic picture. However, when positioned close to the display unit 11 as shown in FIG. 4, the microlens unit 20 simply passes the two-dimensional picture on the display unit 11 as it is.

Figure 5:
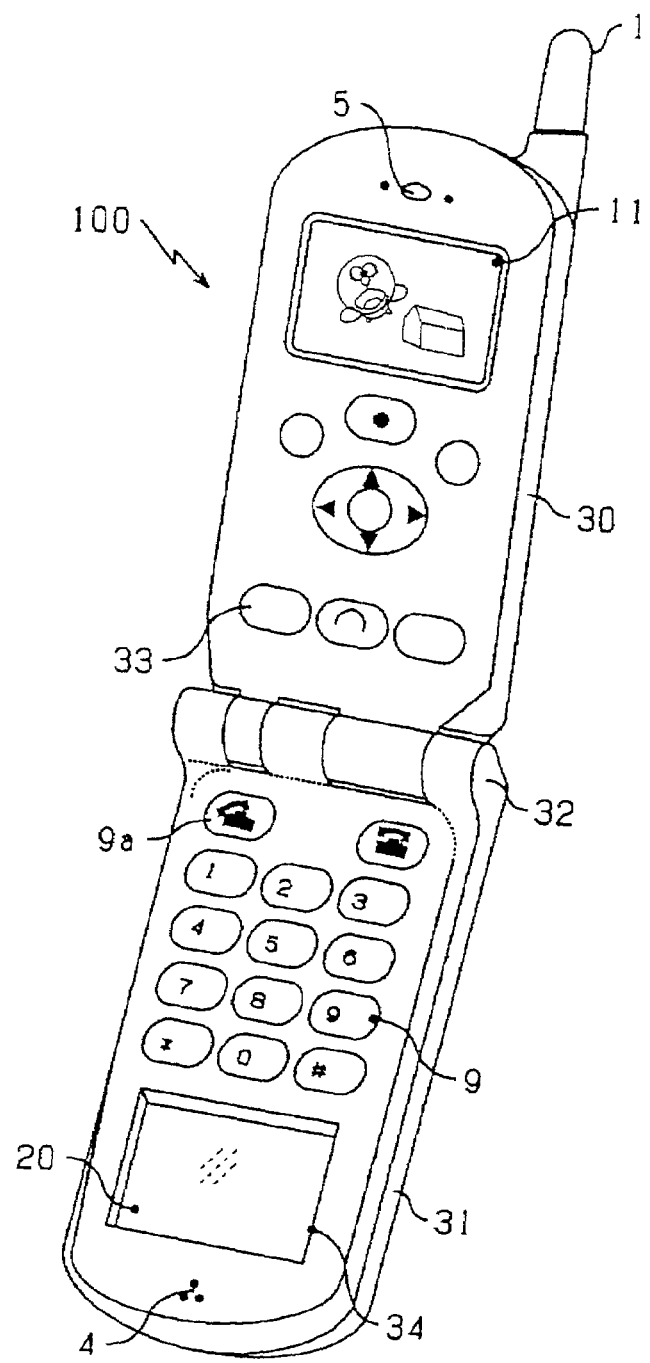
FIG. 5 is a perspective view showing the portable telephone according to a first embodiment in an in-use state.
Figure 6:
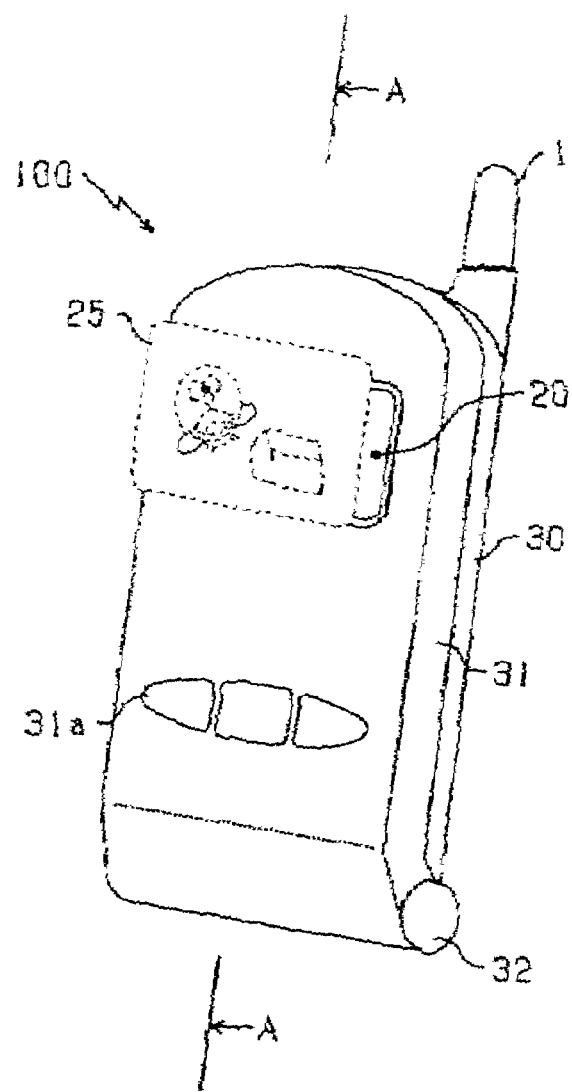
FIG. 6 is a perspective view of the portable telephone according to the first embodiment in a call-waiting state.

Next, the configuration of the foldable potable telephone 100 according to the first embodiment will be described with reference to FIGS. 5 to 7. FIG. 5 is a perspective view of the portable telephone 100 in an in-use state, FIG. 6 is a perspective view of the potable telephone 100 in a call-waiting state, and FIG. 7 is a sectional view of the portable telephone 100 according to the line A—A in FIG. 6.

The portable telephone 100 has a foldable structure in which a body unit 30 and a panel unit 31 are swingably connected to each other by a hinge portion 32. The antenna 1, the display unit 11, the speaker 5 and the plurality of operation buttons 33 including function keys are arranged on the body unit 30. The display unit 11 is a flat display such as a color LCD panel or an organic EL panel, and is attached to the body unit 30 such that the display surface is positioned at the same plane as the inner surface of the body unit 30 (facing the panel unit 31).

The panel unit 31 is provided with the operation buttons 9 such as ten-keys on its inner face (confronting the body unit 30) and the microphone 4, and the microlens unit 20 is put in the opening window 34.

Figure 7:
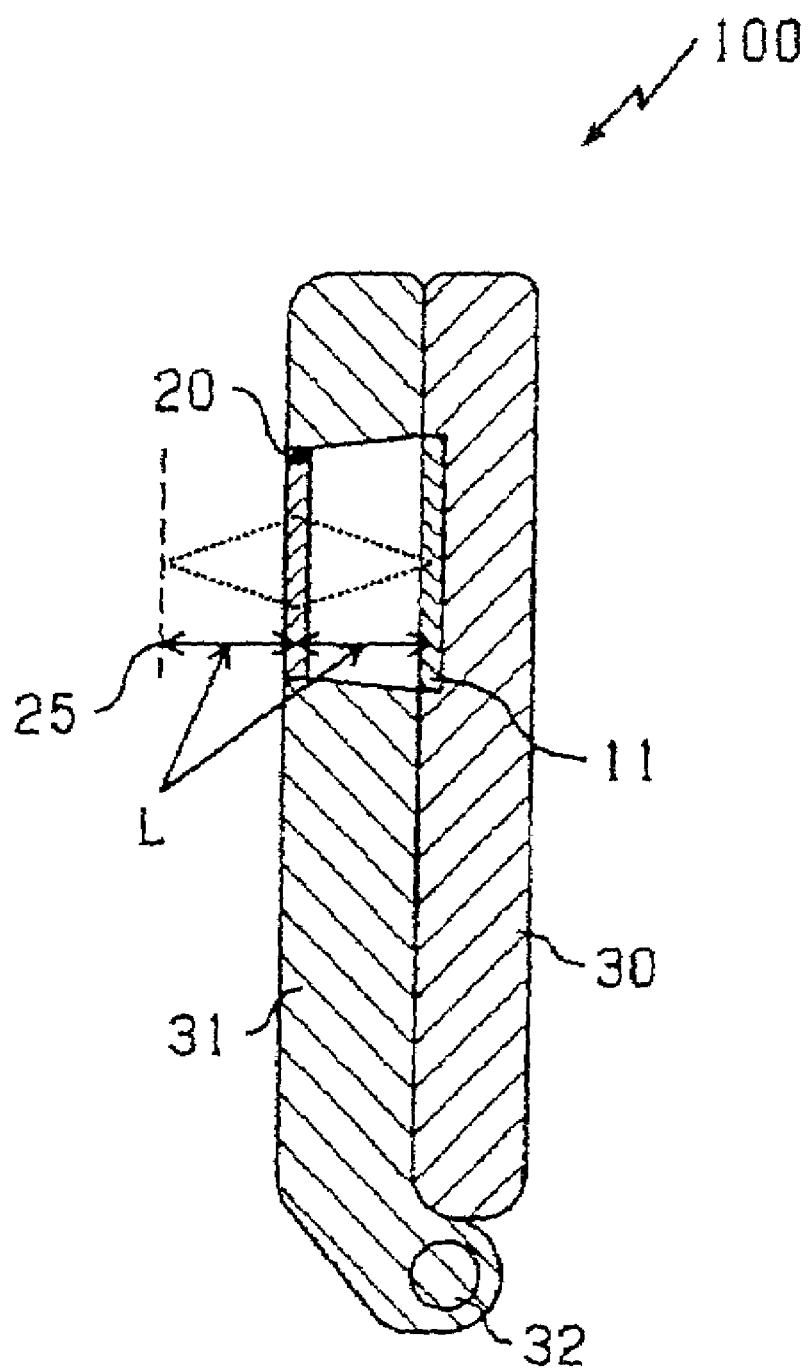
FIG. 7 is a sectional view of the portable telephone according to the first embodiment by line A—A shown in FIG. 6.

When the panel unit 31 is positioned at the folded position (first position) to cover the operation buttons 9 and 33 as shown in FIG. 7, the microlens unit 20 is located at the position remote from the display unit 11 by the focal length L. As described above with reference to FIG. 2, when positioned remotely from the display unit 11 by the focal length L, the microlens unit 20 forms the imaginary image formation plane 25 at the position remote from the surface of the microlens unit 20 by the focal length L, on the side opposite to the display unit 11. Therefore, in the folded state, i.e., in the call-waiting state, the portable telephone 100 can visualize the two-dimensional picture such as character picture displayed on the display unit 11 at the imaginary image formation plane 25 formed by the microlens unit 20 as the pseudo-stereoscopic picture.

On the other hand, when the panel unit 31 is at the opened position (second position) as shown in FIG. 5, i.e., when the user is registering the telephone number or talking, the microlens unit 20 is moved to the position at which the display unit 11 is not covered. Therefore, the display unit 11 of the portable telephone 100 is exposed to the user, and the user can directly read the information displayed on the display unit 11.

Figure 8:
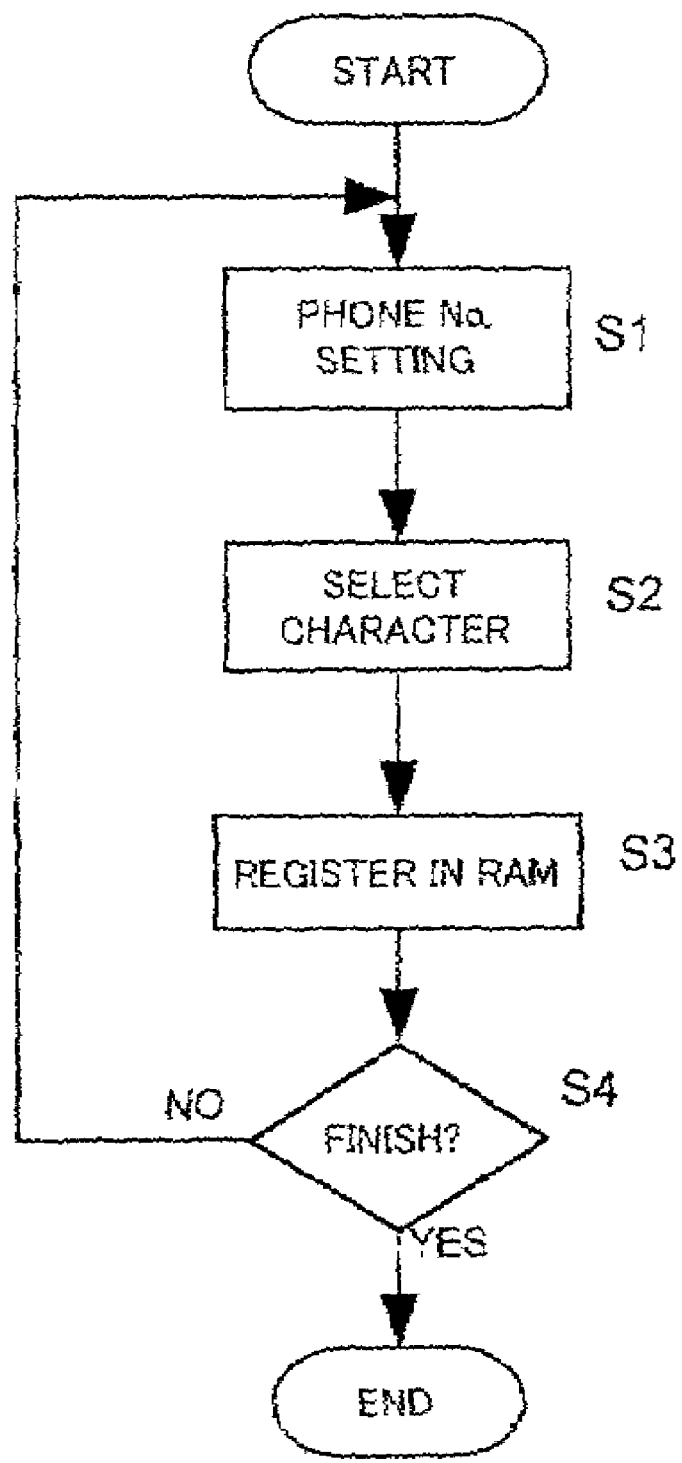
FIG. 8 is a flowchart showing telephone number registering operation.

Next, the operation of registering telephone number for the portable telephone 100 will be described with reference to FIGS. 1 and 8. FIG. 8 is a flowchart showing the telephone number registering operation, the program of which is stored in the ROM 8 in advance as the telephone number registering program.

The portable telephone 100 stores stereoscopic (three-dimensional) character pictures (such as still pictures and animation pictures) in the RAM 7. When the user opens the panel unit 31 and presses the button 33 assigned to the telephone number registration, the controller 6 of the portable telephone 100 automatically executes the telephone number registering program shown in FIG. 8. First, the controller 6 performs telephone number setting control in step S1. Specifically, the controller 6 reads out the character information "NAME?" stored in the ROM 8, and displays "NAME?" on the display unit 11. When the user inputs a person's name by the ten-keys 9 and presses the enter button "#", the controller 6 displays "PHONE No.?" on the display unit 11. When the user inputs the telephone number of the person including the area code and presses the enter button "#", the controller 6 goes to step S2 to select character.

In Step S2, the controller 6 displays "CHARACTER?" and a plurality of character names to be selected on the display unit 11. When the user selects a character and presses the enter button "#", the controller 6 goes to step S3. In step S3, the controller 6 registers the "NAME", "PHONE No." and the selected character name into the RAM 7 in the linked manner. Then, the controller 6 determines whether or not the user made the operation to finish the telephone number registering operation in step S4. If step S4 results in NO, the controller 6 returns to step S1 to repeat the above described steps. On the other hand, if step S4 results in YES, the controller 6 finishes the telephone number registering program.

Figure 9:
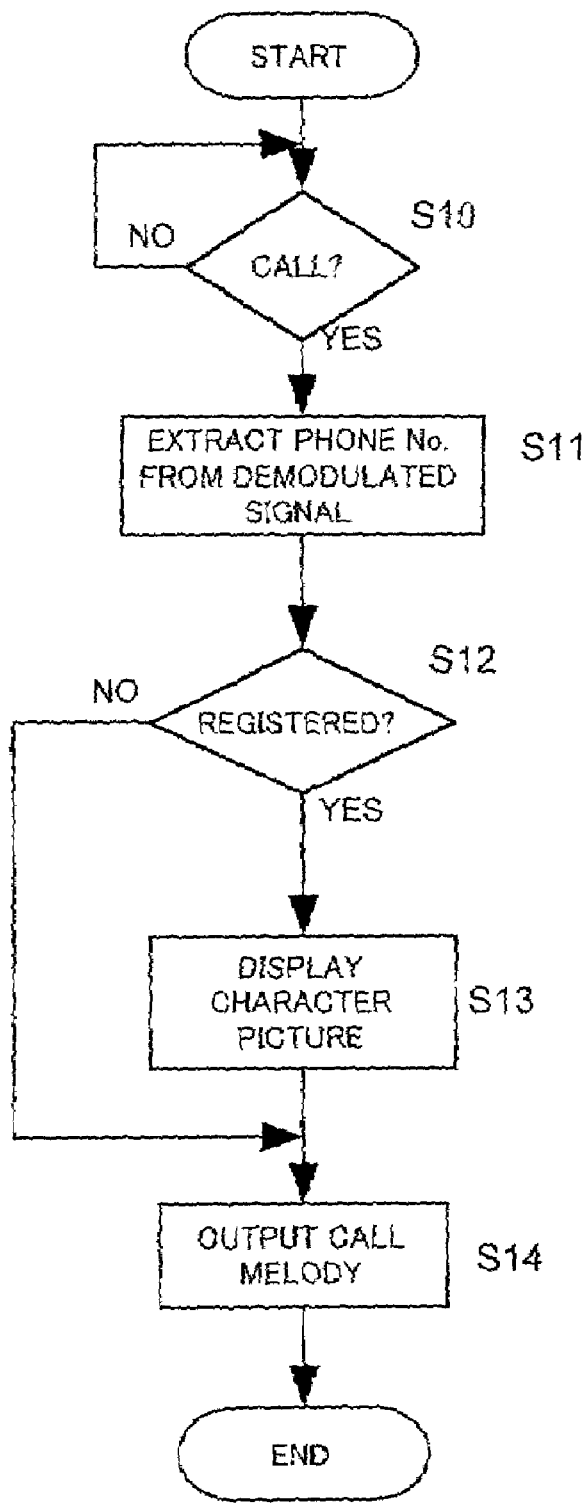
FIG. 9 is a flowchart showing character picture display operation.

Next, the character display operation by the portable telephone 100 at the time of phone-call will be described with reference to FIGS. 1 and 9. FIG. 9 shows the flowchart of the character display operation, the program of which is stored in the ROM 8 in advance as the character display operation program.

The portable telephone 100 receives the radio wave captured by the antenna 1 via the transceiver unit 2, and amplifies and demodulates the radio wave. Out of the demodulated signals, the audio signal is amplified by the low-frequency amplifier 3 and outputted by the speaker 5. Out of the demodulated signals, the character data such as the telephone number of the caller and/or the message are supplied to the controller 6. The transceiver unit 2 has a signal detection circuit (not shown) which outputs a DC voltage when it receives the radio wave. The controller 6 displays the signal intensity on the display unit 11 and determines whether or not the portable telephone 100 is in the radio wave receiving state, by using the output signal of the signal detection circuit.

In the call-waiting state, the controller 6 performs the operation control according to the flowchart shown in FIG. 9. First, the controller 6 detects the call-receiving state in step S10. When the call is detected (step S10;YES), the controller 6 goes to step S11. In step S11, the controller 6 extracts the character information such as the caller's telephone numbers and the messages from the demodulated signals and stores them into the RAM 7, and then goes to step S12. In step S12, the controller 6 determines whether or not the caller's telephone number is registered in the RAM 7. If step S12 results in NO, the controller 6 generates call melody indicating a phone call from a sound source or the like (not shown), and then ends the character display operation program.

On the other hand, if the controller 6 determines that the caller's telephone number is registered in the RAM 7 (step S12;YES), the controller 6 goes to step S13. The controller 6 reads out the character picture data linked with the caller's telephone number thus detected, and controls the drive circuit 10 to display the character picture on the display unit 11. Then, the controller 6 generates the call melody indicating a phone call in step S14, and ends the character display operation program.

As described above, according to the portable telephone 100 of the present invention, the microlens unit 20 is positioned in front of the display unit 11 when the panel unit 31 is in the folded position (i.e., in the call-waiting state) shown in FIG. 6. Therefore, when the portable telephone 100 displays the character picture on the display unit 11 after receiving the call, the character picture is visualized by the microlens unit 20 as a pseudo-stereoscopic picture, thereby giving the user pleasure or enjoyable feeling at the time of phone call.

On the other hand, when the panel unit 31 is in the first position (i.e., in-use position) as shown in FIG. 5, the panel unit 31 is opened so that the microlens unit 20 is moved to the position not to cover the display unit 11. Therefore, the display unit 11 of the potable telephone 100 is exposed to provide the user with the normal, two-dimensional picture. The display unit 11 of the portable telephone 100 displays the telephone number and the like, which are not needed and suitable to be displayed in the pseudo-stereoscopic manner, thereby avoiding the user's eyestrain.

In the above portable telephone 100, the character picture displayed at the time of phone-call is visualized as the pseudo-stereoscopic picture. However, the game picture may be displayed on the display unit 11 by the manipulation of the operation button 31 provided on the outer surface of the panel 31 so that the user can enjoy the game with seeing the game picture in the pseudo-stereoscopic manner in the state that the panel unit 31 is folded.

Next, other embodiments of the present invention will be described below. It is noted that the circuit configuration of the portable telephones described below are identical to that of the portable telephone 100 of the first embodiment, and hence the description thereof will be omitted.

[2nd Embodiment]

Figure 10:
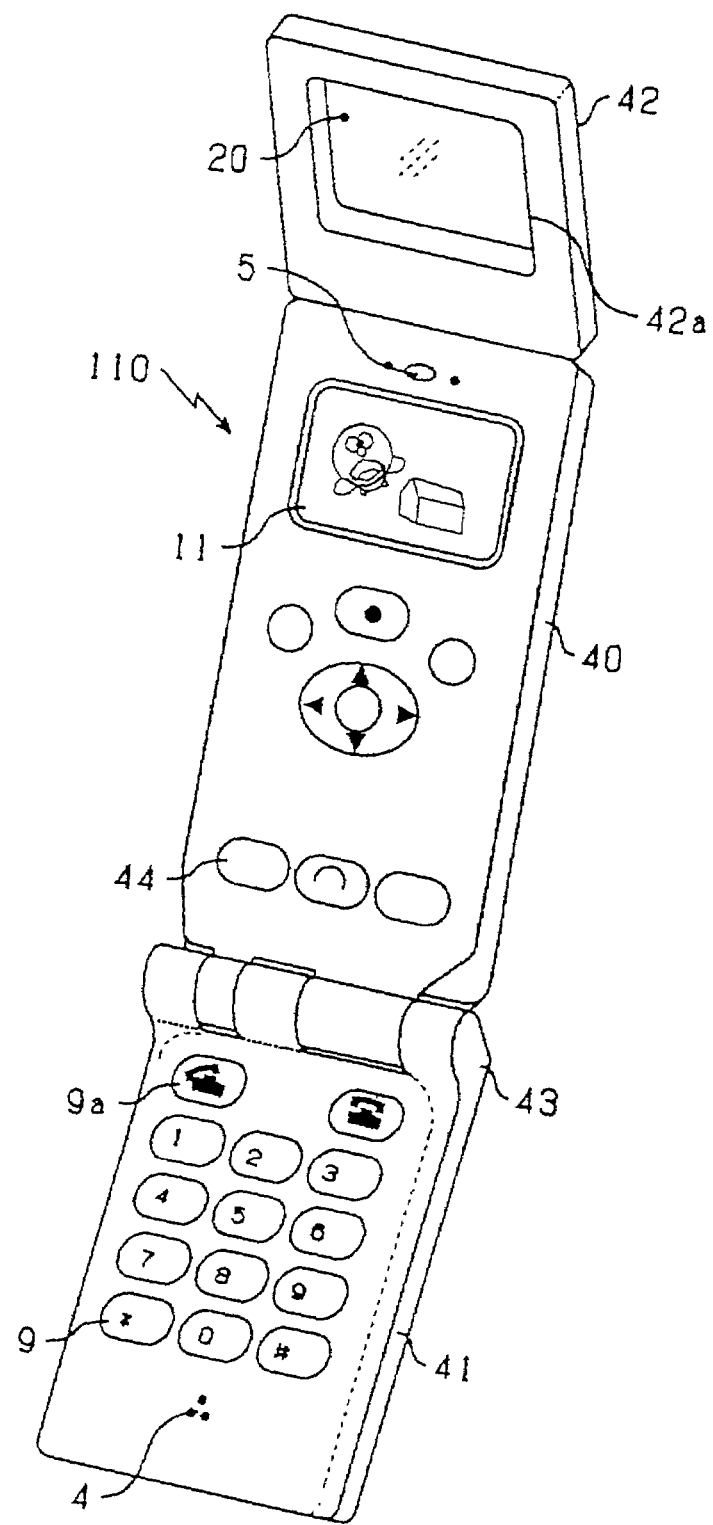
FIG. 10 is a perspective view of the portable telephone according to a second embodiment in an in-use state.

The configuration of the foldable portable telephone 110 according to the second embodiment will be described with reference to FIGS. 10 and 11. FIG. 10 is a perspective view of the portable telephone 110 in the in-use state, and FIG. 11 is a perspective view of the portable telephone 110 in the call-waiting state.

As shown in FIG. 10, the portable telephone 110 is configured by a body unit 40, a first panel unit 41 and a second panel unit 42. The antenna 1, the display unit 11, the speaker 5 and a plurality of function keys 44 are arranged on the body unit 40. The first panel unit 41 is connected to the lower end of the body unit 40 by the hinge portion 43 such that the first panel unit 41 can be opened and closed, and the operation buttons 9 such as ten-keys and the microphone 4 are arranged on the inner face of the first panel unit 41 confronting the body unit 40. On the other hand, the second panel unit 42 is connected to the upper end of the body unit 40 by a connecting portion (not shown) such that the second panel unit 42 can be opened and closed. The microlens unit 20 is attached in the opening window 42a. Therefore, the portable telephone 110 according to the second embodiment differs from the portable telephone 100 according to the first embodiment in that only the microlens unit 20 is attached to the body unit 40 in such a manner that it can be arbitrarily opened and closed, and other portions are configured in the same manner as those of the portable telephone 100 according to the first embodiment.

Figure 11:
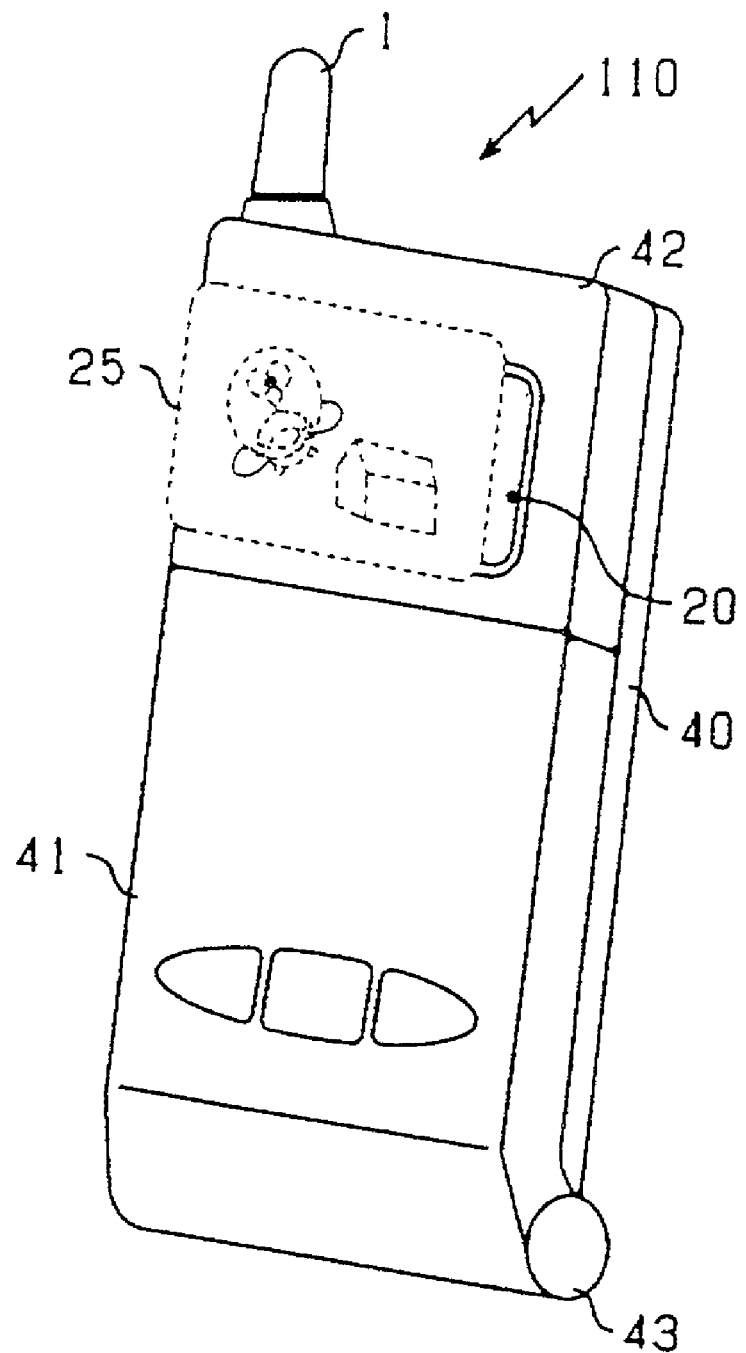
FIG. 11 is a perspective view of the portable telephone according to the second embodiment in a call-waiting state.

Therefore, according to the portable telephone 110, when the panel units 41 and 42 are in the folded, second position (call-waiting state) as shown in FIG. 11, the microlens unit 20 is positioned to confront the front face of the display unit 11. By this, the portable telephone 110 visualizes the character picture at the time of phone call as a pseudo-stereoscopic picture, thereby giving the user pleasure or enjoyable feeling at the time of phone call. Further, according to the portable telephone 110, since only the second panel unit 42 having the microlens unit 20 may be opened and closed, the user can, if desired, open only the second panel unit 42 to see the normal two-dimensional picture displayed on the display unit 11.

On the other hand, when the panel units 41 and 42 are in the opened, first position (in-use state) as shown in FIG. 10, the microlens unit 20 is moved to the position not to over the display unit 11. Therefore, the portable telephone 110 exposes the display unit 11, and provides the normal two-dimensional picture which is easy to see by the user.

[3rd Embodiment]

Figure 12:
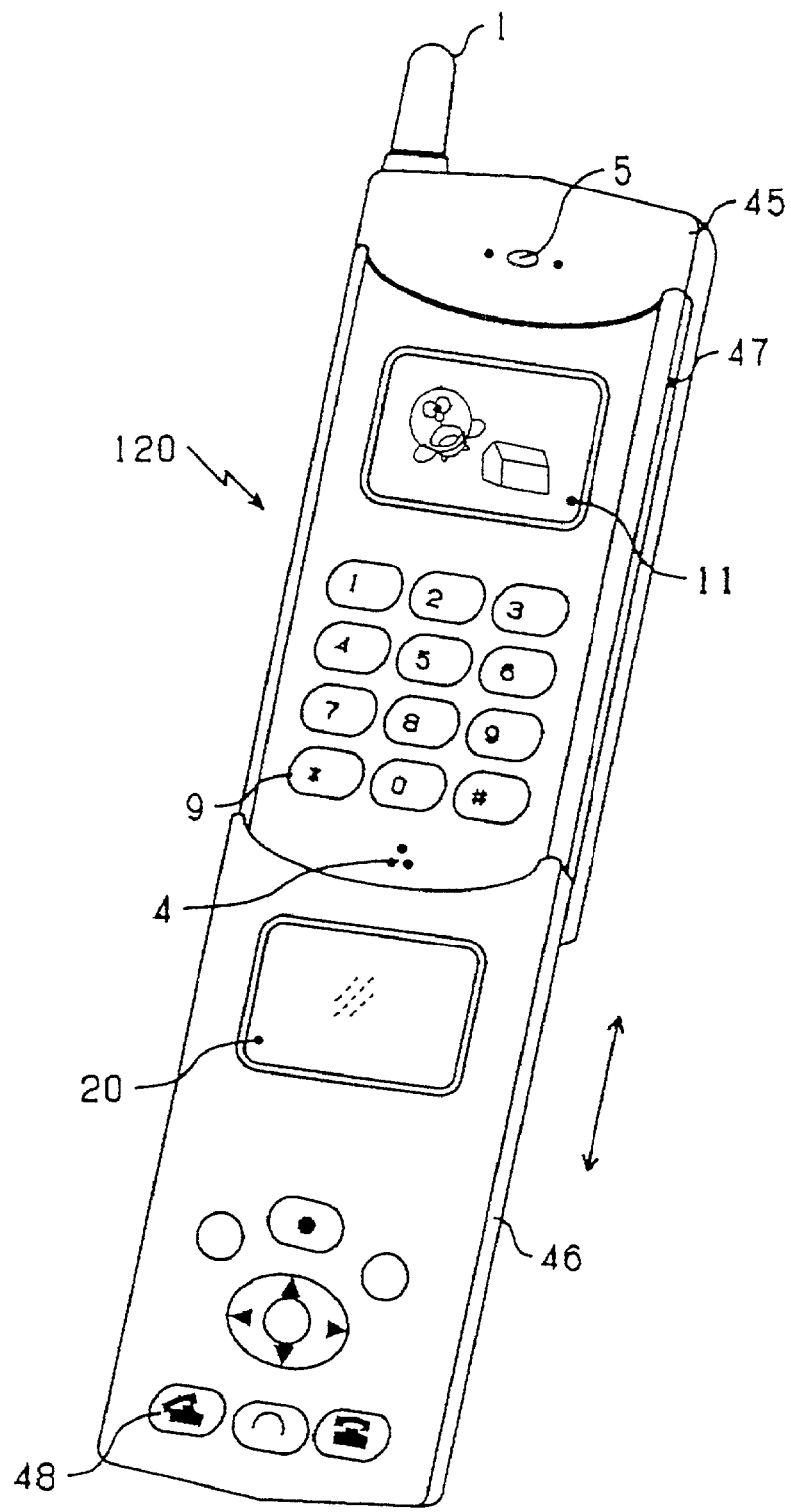
FIG. 12 is a perspective view of the portable telephone according to a third embodiment in an in-use state.

Next, the configuration of the slide-type portable telephone 120 according to the third embodiment of the present invention will be described with reference to FIGS. 12 and 13. FIG. 12 is a perspective view of the portable telephone 120 in the in-use state, and FIG. 13 is a perspective view of the portable telephone 120 in the call-waiting state.

As shown in FIG. 12, the portable telephone 120 is configured by the body unit 45 and the panel unit 46, and the panel unit 46 is attached to the body unit 45 in a manner slidable in the direction of the arrow in FIG. 12. The antenna 1, the display unit 11, the speaker 5, the operation buttons 9 and the microphone 4 are arranged on the body unit 45, and the microlens unit 20 and a plurality of function buttons 48 are arranged on the panel unit 46. The portable telephone 120 according to the third embodiment differs from the portable telephones according to the first and second embodiment in that the panel unit 46 is attached to the body unit 45 in the slidable manner, and other portions are configured in the same manner.

Figure 13:
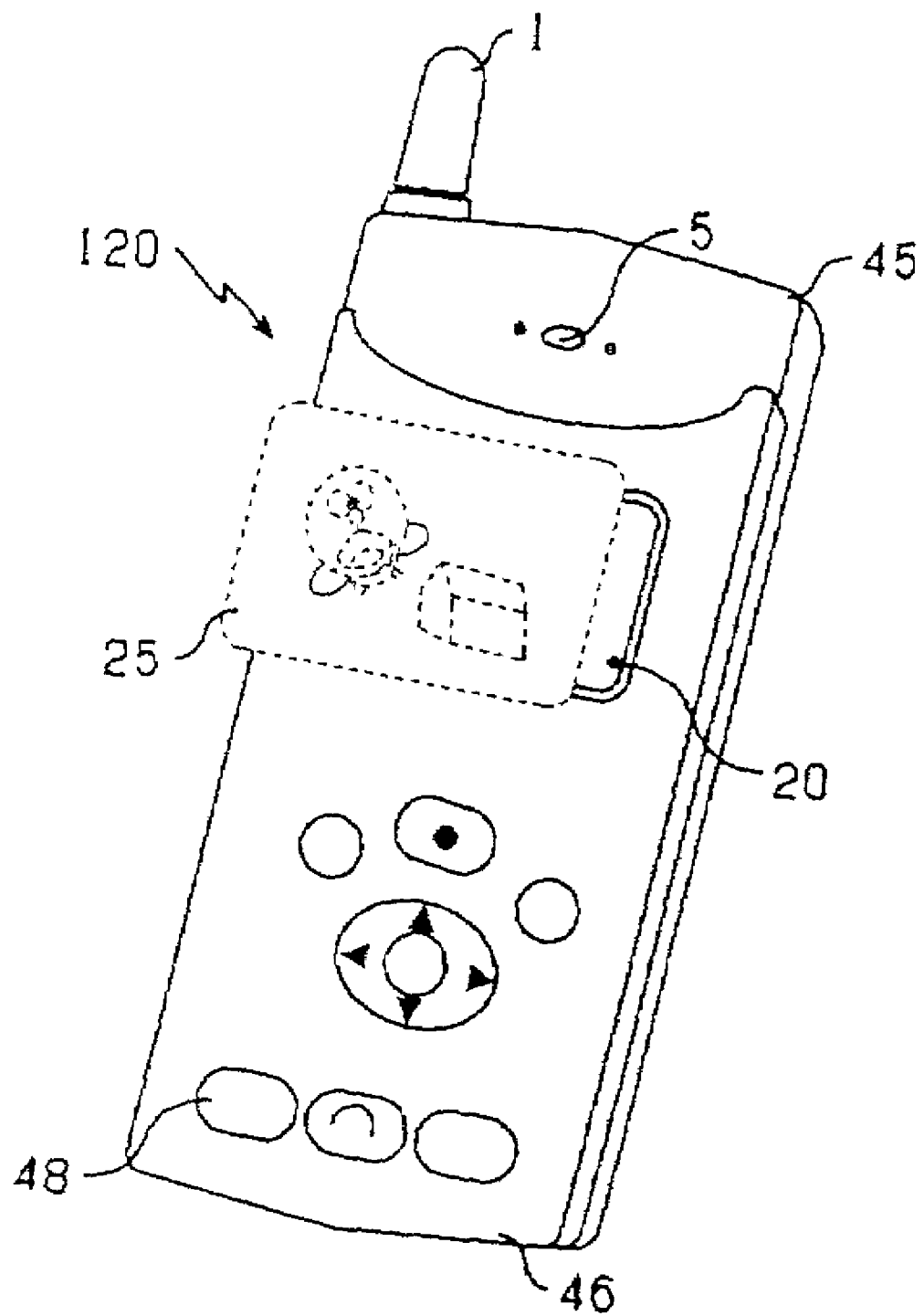
FIG. 13 is a perspective view of the portable telephone according to the third embodiment in a call-waiting state.

Therefore, according to the portable telephone 120, when the slidable panel units 46 is in the closed, second position (call-waiting state) as shown in FIG. 13, the microlens unit 20 is positioned to confront the front face of the display unit 11. By this, the portable telephone 120 visualizes the character picture at the time of phone call as a pseudo-stereoscopic picture, thereby giving the user pleasure or enjoyable feeling at the time of phone call.

On the other hand, when the slidable panel units 46 is in the pulled-down, first position (in-use state) as shown in FIG. 12, the microlens unit 20 is moved to the position not to cover the display unit 11. Therefore, the portable telephone 120 exposes the display unit 11, and provides the normal two-dimensional picture which is easy to see by the user.

[4th Embodiment]

Figure 14:
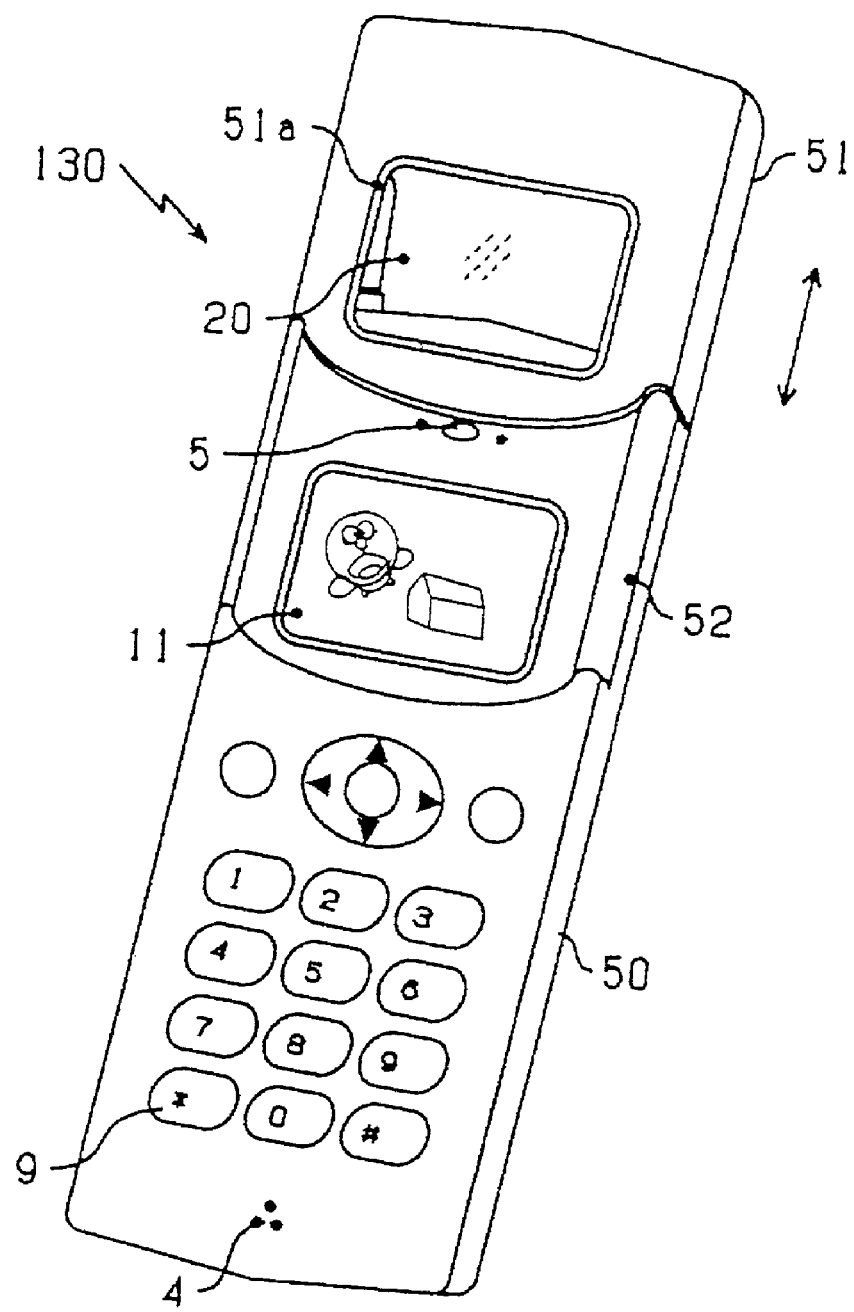
FIG. 14 is a perspective view of the portable telephone according to a fourth embodiment in an in-use state.

Next, the configuration of the slide-type portable telephone 130 according to the fourth embodiment of the present invention will be described with reference to FIGS. 14 and 15. FIG. 14 is a perspective view of the portable telephone 130 in the in-use state, and FIG. 15 is a perspective view of the portable telephone 130 in the call-waiting state.

As shown in FIG. 14, the portable telephone 130 is configured by the body unit 50 and the panel unit 51, and the panel unit 51 is attached to the body unit 50 in a manner slidable along the groove 52 in the direction of the arrow in FIG. 14. The antenna 1, the display unit 11, the speaker 5, the operation buttons 9 and the microphone 4 are arranged on the body unit 50, and the microlens unit 20 is attached to the opening window 51a of the panel unit 51. The portable telephone 130 according to the fourth embodiment differs from the portable telephone 120 according to the third embodiment in that the panel unit 51 has only the microlens unit 20, and other portions are configured in the same manner.

Figure 15:
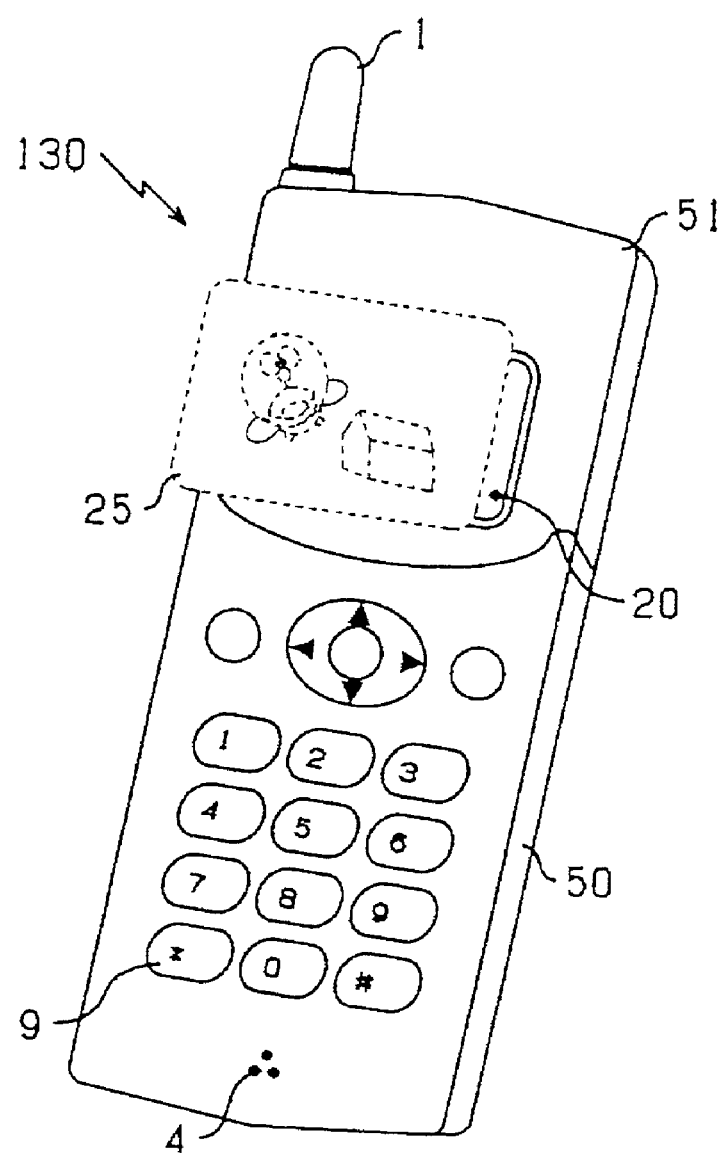
FIG. 15 is a perspective view of the portable telephone according to the fourth embodiment in a call-waiting state.

According to the portable telephone 130, when the panel units 51 is in the closed, second position (call-waiting state) as shown in FIG. 15, the microlens unit 20 is positioned to confront the front face of the display unit 11. By this, the portable telephone 130 visualizes the character picture at the time of phone call as a pseudo-stereoscopic picture, thereby giving the user pleasure or enjoyable feeling at the time of phone call. Further, according to the portable telephone 130, the user can, if desired, slide the panel 51 to see the normal two-dimensional picture displayed on the display unit 11.

On the other hand, when the panel units 51 is in the pulled-up, first position (in-use state) as shown in FIG. 14, the microlens unit 20 is moved to the position not to over the display unit 11. Therefore, the portable telephone 130 exposes the display unit 11, and provides the normal two-dimensional picture.

[5th Embodiment]

Figure 16:
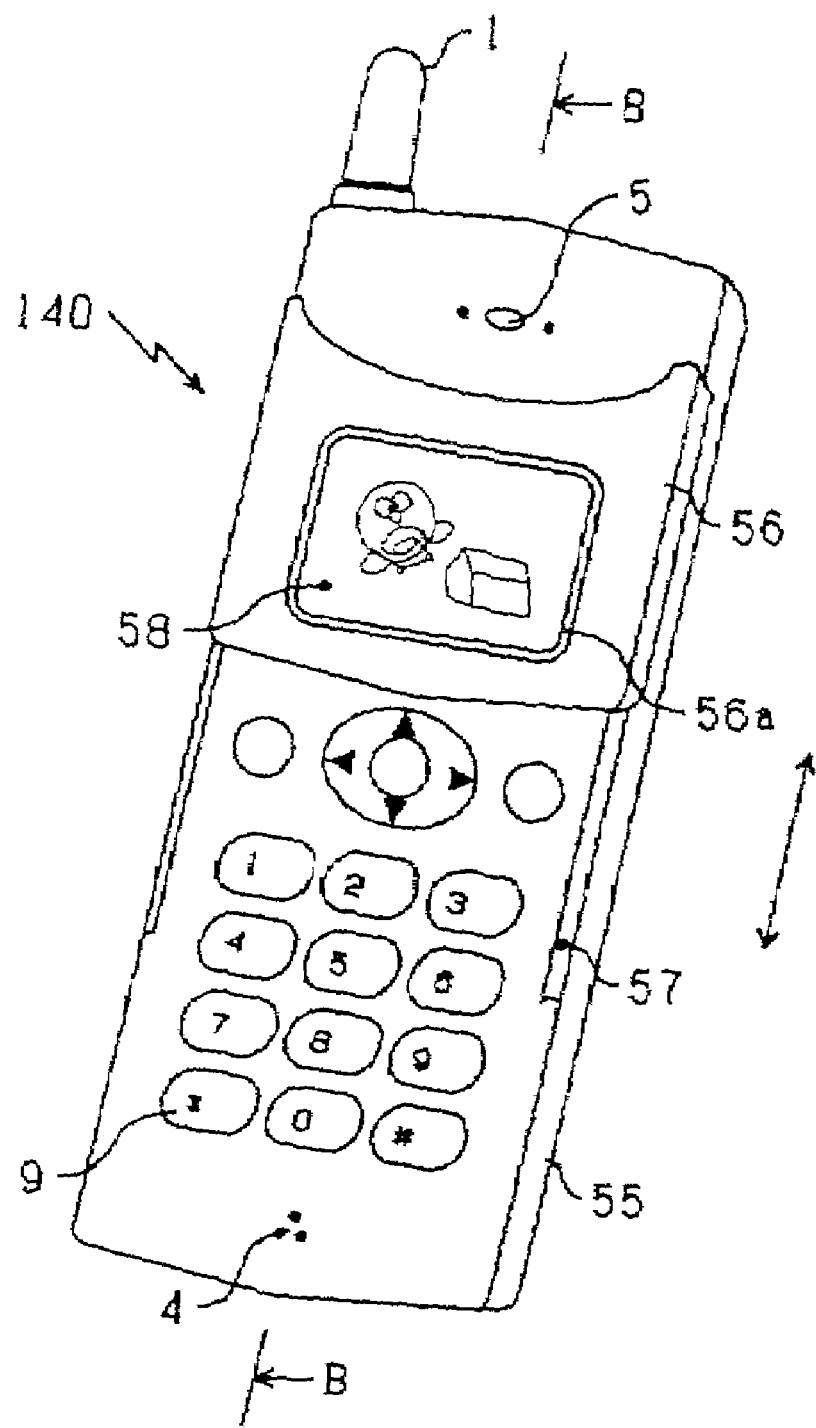
FIG. 16 is a perspective view of the portable telephone according to a fifth embodiment in an in-use state.

Next, the configuration of the slide-type portable telephone 140 according to the fifth embodiment of the present invention will be described with reference to FIGS. 16 to 19. FIG. 16 is a perspective view of the portable telephone 140 in the in-use state, FIG. 17 is a sectional view of the portable telephone 140 at the B—B line in FIG. 16, FIG. 18 is a perspective view of the portable telephone 140 in the call-waiting state, and FIG. 19 is a sectional view of the portable telephone 140 at the C—C line in FIG. 18.

As shown in FIG. 16, the portable telephone 140 is configured by the body unit 55 and the panel unit 56. The panel unit 56 is attached to the body unit 55 in a manner slidable along the groove 57 in the direction of the arrow in FIG. 16. The antenna 1, the display unit 11, the speaker 5, the operation buttons 9, the microphone 4 and the microlens unit 20 are arranged on the body unit 55, and the screen 58 made of transparent acrylic plate is attached in the opening window 56a of the panel unit 56.

Figure 17:
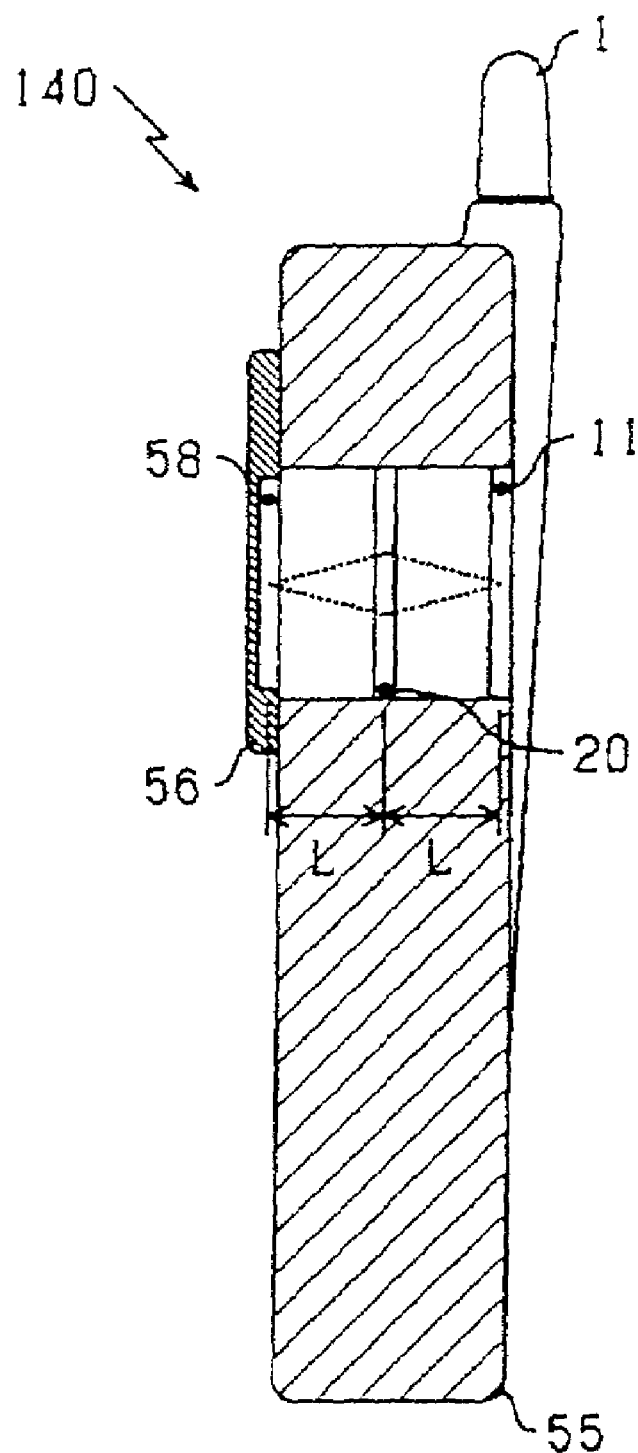
FIG. 17 is a sectional view of the portable telephone according to the fifth embodiment by line B—B in FIG. 16.

As shown in FIG. 17, the microlens unit 20 is at the position remote from the display unit 11 by the focal length L of the microlens unit 20. When the panel unit 56 is at the upper position where it does not cover the operation buttons 9 on the body unit 55, the screen 58 is at the position remote from the microlens unit 20 by the focal length L.

Figure 18:
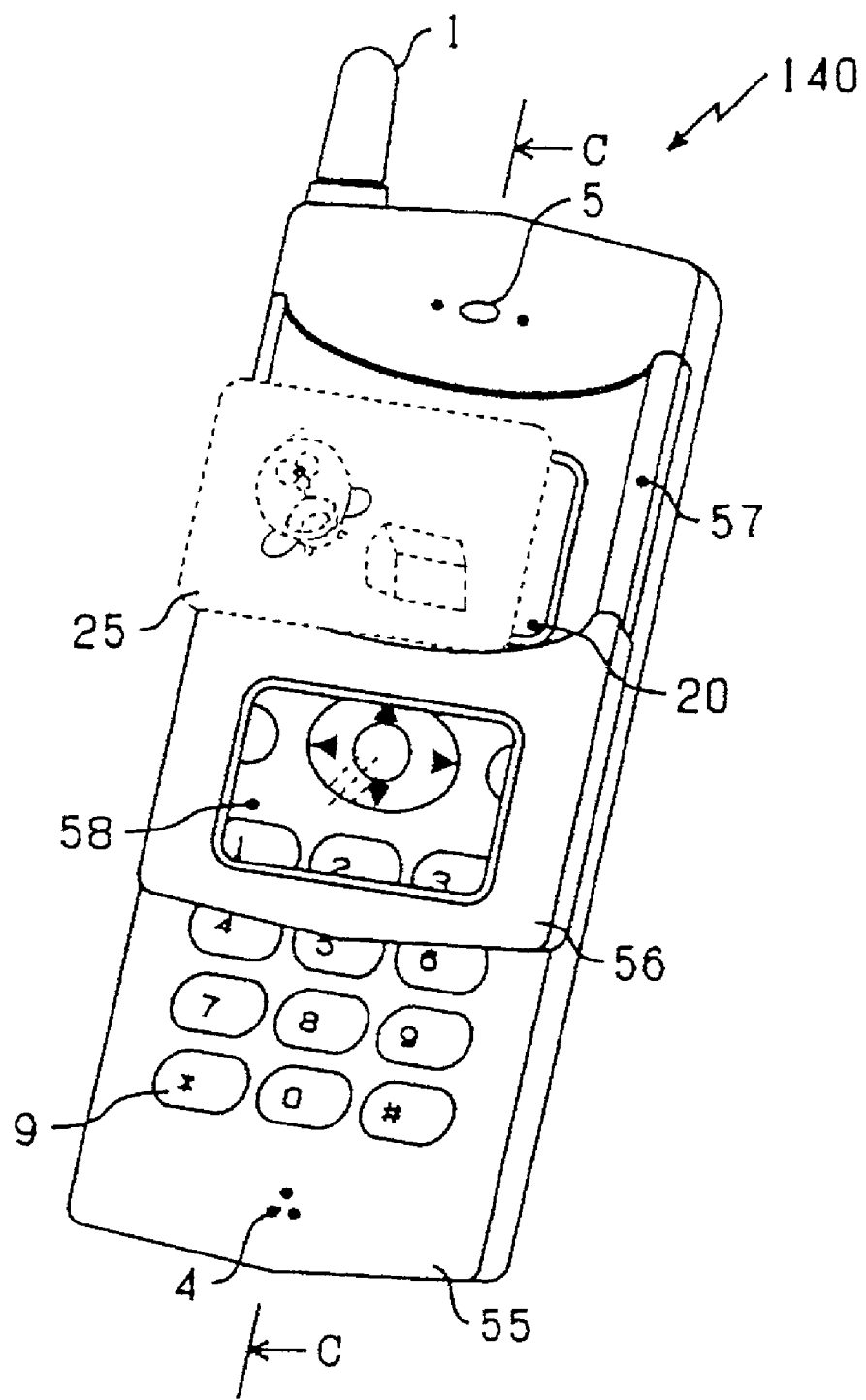
FIG. 18 is a perspective view of the portable telephone according to the fifth embodiment in a call-waiting state.
Figure 19:
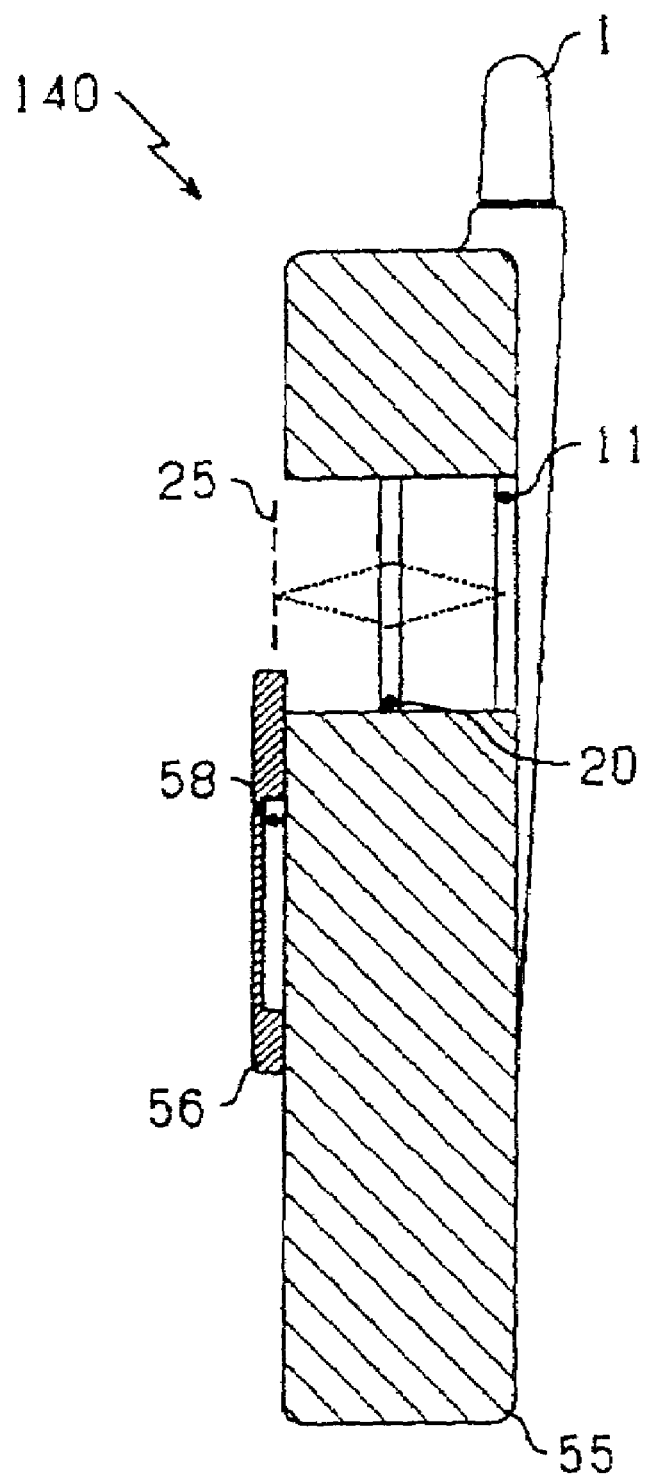
FIG. 19 is a sectional view of the portable telephone according to the fifth embodiment by line C—C in FIG. 18.

According to the portable telephone 140, when the slidable panel unit 56 is in the pulled-down, second position (call-waiting state) as shown in FIGS. 18 and 19, the portable telephone 140 visualizes the character picture at the time of phone call as a pseudo-stereoscopic picture at the imaginary image formation plane 25, thereby giving the user pleasure or enjoyable feeling at the time of phone call.

On the other hand, when the panel unit 56 is in the pulled-up, first position (in-use state) as shown in FIGS. 16 and 17, the screen 58 is at the position coincident with the imaginary image formation plane 25 formed by the microlens unit 20. Therefore, the portable telephone 140 projects the picture on the display unit 11 on the screen 58, and provides the normal two-dimensional picture in a manner easy to see by the user.

[6th Embodiment]

Figure 20:
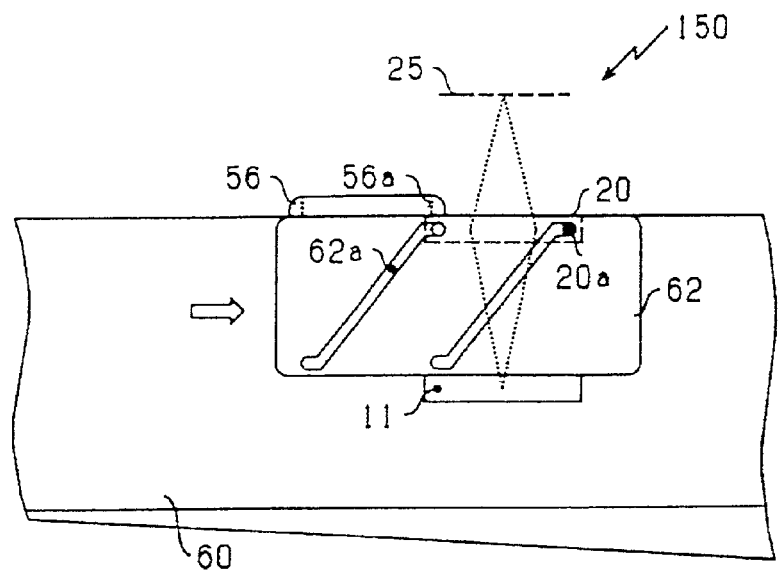
FIG. 20 is a magnified sectional view of a portion of the portable telephone according to the sixth embodiment in a call-waiting state.
Figure 21:
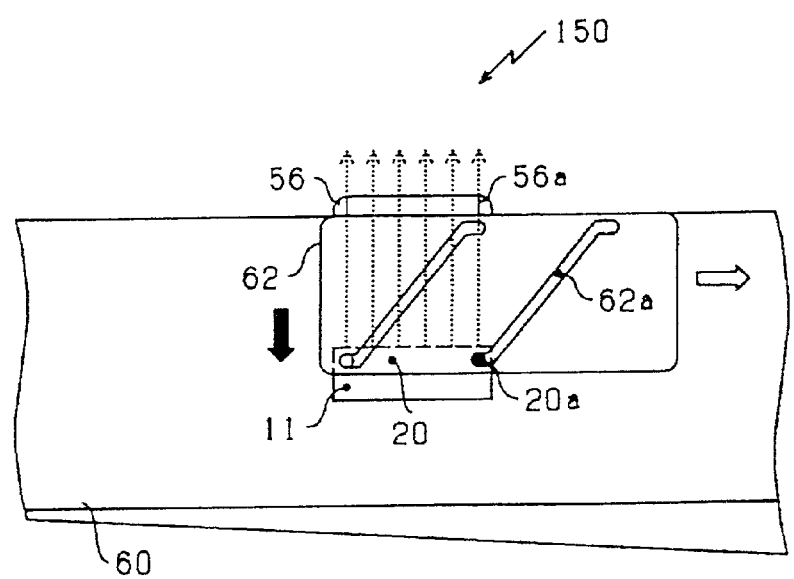
FIG. 21 is a magnified sectional view of a portion of the portable telephone according to the sixth embodiment in an in-use state.

Next, the configuration of the portable telephone 150 according to the sixth embodiment of the present invention will be described with reference to FIGS. 20 and 21. FIG. 20 is a magnified sectional view of a portion of the portable telephone 150 in the call-waiting state, and FIG. 21 is a magnified sectional view of a part of the portable telephone 150 in the in-use state.

The portable telephone 150 has the appearance generally identical to that of the portable telephone 140 according to the fifth embodiment shown in FIG. 16. The portable telephone 150 according to the sixth embodiment differs from the portable telephone 140 according to the fifth embodiment in that the screen 58 is not attached to the opening window 56a of the panel unit 56 and that the sliding plate 62 connected to the panel unit 56 moves the microlens unit 20 vertically upward and downward with respect to the display unit 11.

Specifically, the pins 20a protruding from both sides of the microlens unit 20 are inserted into the oblique guide grooves 62a of the sliding plate 62 and the vertical guide slot of the guide plate (not shown). The guide grooves 62a of the sliding plate 62 are formed in a manner obliquely extending downward and leftward direction in FIGS. 20 and 21, and the leftward-rightward movement of the sliding plate 62 moves the microlens unit 20 vertically upward and downward with respect to the display unit 11.

According to the portable telephone 150, when the panel unit 56 is at the first position (call-waiting position) covering a part of the operation unit of the body unit as shown in FIG. 20, the microlens unit 20 is located at the position remote from the display unit 11 by the focal length by means of the sliding plate 62 (i.e., first position), and the portable telephone 140 visualizes the character picture at the time of phone call as a pseudo-stereoscopic picture at the imaginary image formation plane 25, thereby giving the user pleasure or enjoyable feeling at the time of phone call.

On the other hand, when the panel unit 56 is pulled up to the second position at the upper area of the portable telephone by the user (i.e., in-use state) as shown in FIG. 21, the microlens unit 20 moves to and closely contacts the display unit 11 by the cooperation with the sliding plate 62. Therefore, the microlens unit 20 passes the picture on the display unit 11 to provide the normal two-dimensional picture in a manner easy to see by the user.

[7th Embodiment]

Figure 22:
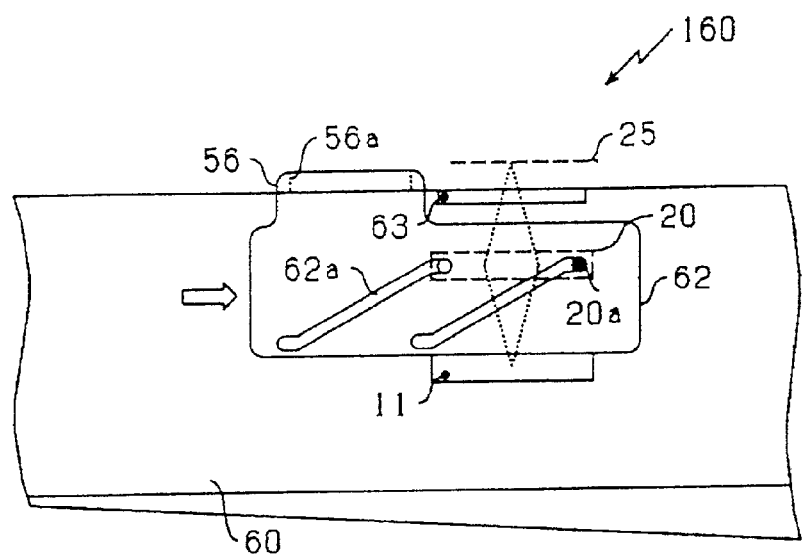
FIG. 22 is a magnified sectional view of a portion of the portable telephone according to the seventh embodiment in a call-waiting state.

Next, the configuration of the portable telephone 160 according to the seventh embodiment of the present invention will be described with reference to FIGS. 22 and 23. FIG. 22 is a magnified sectional view of a part of the portable telephone 160 in the call-waiting state, and FIG. 23 is a magnified sectional view of a part of the portable telephone 160 in the in-use state.

The portable telephone 160 according to the seventh embodiment differs from the portable telephone 150 according to the sixth embodiment in that the screen 63 is provided to the body unit 60 to cover the front face of the microlens unit 20. By this, the microlens unit 20 is protected from possible scratch or dust.

According to the portable telephone 160, when the panel unit 56 is at the first position (call-waiting position) covering a part of the operation unit of the body unit as shown in FIG. 22, the microlens unit 20 is located at the position remote from the display unit 11 by the focal length by means of the sliding plate 62 (i.e., first position), and visualizes the character picture at the time of phone call as a pseudo-stereoscopic picture at the imaginary image formation plane 25, thereby giving the user pleasure or enjoyable feeling at the time of phone call.

Figure 23:
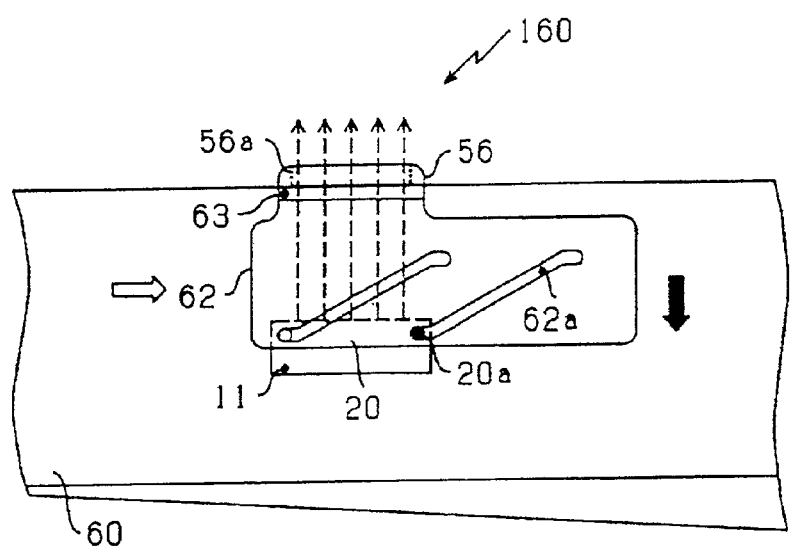
FIG. 23 is a magnified sectional view of a portion of the portable telephone according to the seventh embodiment in an in-use state.

On the other hand, when the panel unit 56 is pulled up to the second position at the upper area of the portable telephone by the user (i.e., in-use state) as shown in FIG. 23, the microlens unit 20 moves to and closely contacts the display unit 11 by the cooperation with the movement of the sliding plate 62 in the right direction in FIG. 23. Therefore, the portable telephone 160 passes the two-dimensional picture on the display unit 11 through the microlens unit 20 and the screen 63 to provide the normal two-dimensional picture in a manner easy to see by the user.

[8th Embodiment]

Figure 24:
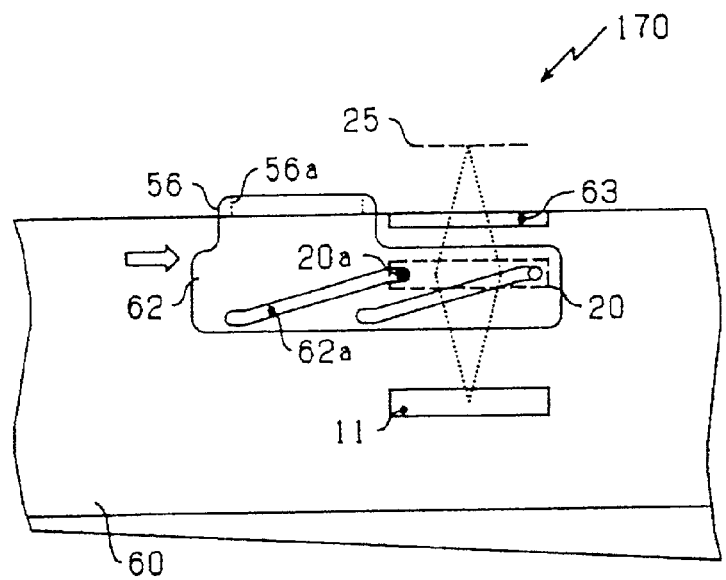
FIG. 24 is a magnified sectional view of a portion of the portable telephone according to the eighth embodiment in a call-waiting state.

Next, the configuration of the portable telephone 170 according to the eighth embodiment of the present invention will be described with reference to FIGS. 24 and 25. FIG. 24 is a magnified sectional view of a part of the portable telephone 170 in the call-waiting state, and FIG. 25 is a magnified sectional view of a part of the portable telephone 170 in the in-use state.

The portable telephone 170 according to the eighth embodiment differs from the portable telephone 160 according to the seventh embodiment in that the movable range of the microlens unit 20 by the sliding plate 62 is changed. Namely, according to the portable telephone 160 of the seventh embodiment, the microlens unit 20 is moved between the position remote from the display unit 11 by the focal length (see. FIG. 22) and the position in close contact with the display unit 11 (see. FIG. 23). In contrast, according to the portable telephone 170 according to the eighth embodiment, the microlens unit 20 is moved between the position remote from the display unit 11 by the focal length (see. FIG. 24) and the position at the middle of the screen 63 and the display unit 11 (see. FIG. 25).

According to the portable telephone 170, when the panel unit 56 is at the first position (call-waiting position) covering a part of the operation unit of the body unit as shown in FIG. 24, the microlens unit 20 is located at the position remote from the display unit 11 by the focal length by means of the sliding plate 62 (i.e., first position), and visualizes the character picture displayed on the display unit 11 at the time of phone call as a pseudo-stereoscopic picture at the imaginary image formation plane 25 over the screen 63, thereby giving the user pleasure or enjoyable feeling at the time of phone call.

Figure 25:
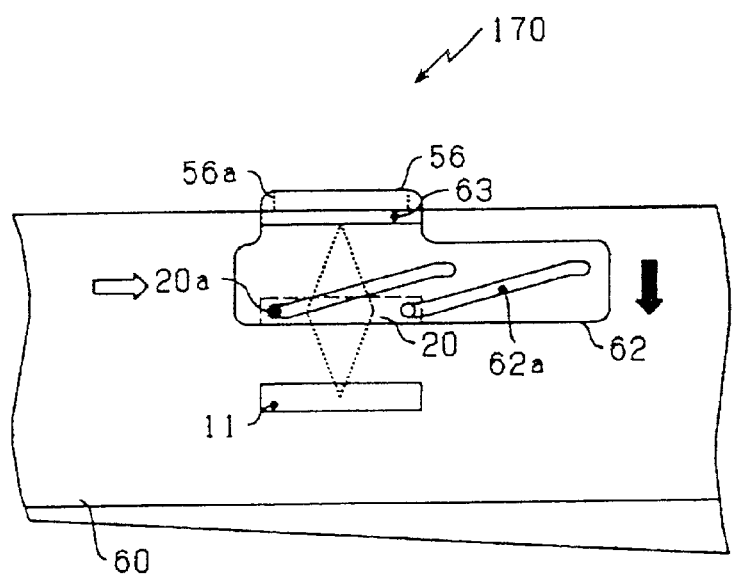
FIG. 25 is a magnified sectional view of a portion of the portable telephone according to the eighth embodiment in an in-use state.

On the other hand, when the panel unit 56 is pulled up to the second position at the upper area of the portable telephone 170 by the user (i.e., in-use state) as shown in FIG. 25, the microlens unit 20 moves down to position at the middle of the screen 63 and the display unit 11 by the cooperation with the movement of the sliding plate 62 in the right direction in FIG. 25 (this is second position). Therefore, the portable telephone 170 projects the two-dimensional picture on the display unit 11 by the microlens unit 20 onto the screen 63 to provide the normal two-dimensional picture in a manner easy to see by the user.

[9th Embodiment]

Figure 26:
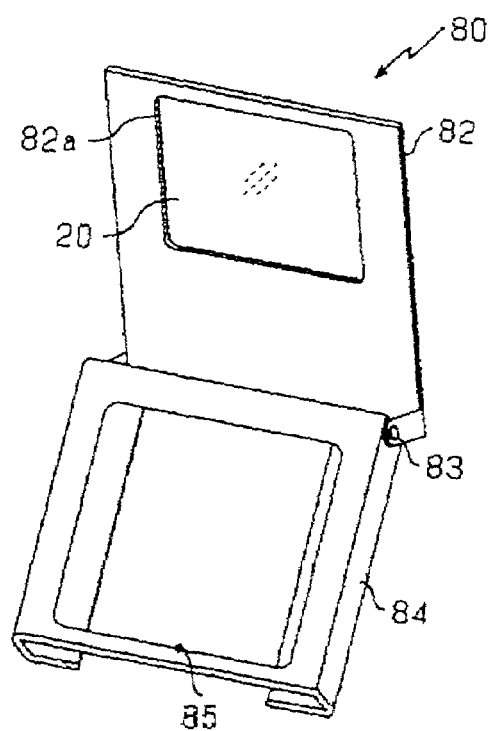
FIG. 26 is a perspective view of a lens adapter according to a ninth embodiment in an opened state.
Figure 27:
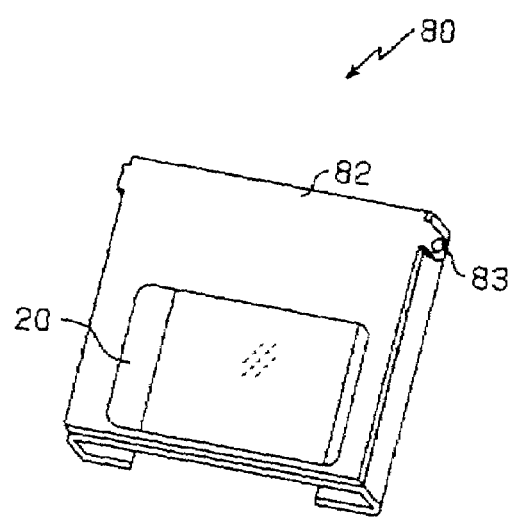
FIG. 27 is a perspective view of a lens adapter according to the ninth embodiment in a closed state.

Next, the configuration and using manner of the lens adapter 80 according to the ninth embodiment of the present invention will be described with reference to FIGS. 26 to 30. FIG. 26 is a perspective view of the lens adapter 80 when the panel unit 82 is opened, FIG. 27 is a perspective view of the lens adapter 80 when the panel unit 82 is closed, FIG. 28 is a perspective view of the portable telephone 180 to which the lens adapter 80 can be attached, FIG. 29 is a perspective view of the portable telephone 180 when the lens adapter 80 is attached and the panel unit 82 is closed, and FIG. 30 is a perspective view of the portable telephone 180 when the lens adapter 80 is attached and the panel unit 82 is opened.

First, the configuration of the lens adapter 80 will be described. As shown in FIG. 26, the lens adapter 80 includes the attachment unit 84 and the panel unit 82. Both sides of the attachment unit 84 are folded so that it may be attached to a general-use portable telephone 180 as shown in FIGS. 29 and 30. The attachment unit 84 has an opening window 85 by which the display unit 11 and the speaker 5 of the portable telephone 180 are exposed. On the other hand, the panel unit 82 has an opening window 82a to which the microlens unit 20 is attached. The panel unit 82 is attached to the attachment unit 84 by the hinge portion 83 such that the panel unit 82 can be opened and closed.

Figure 28:
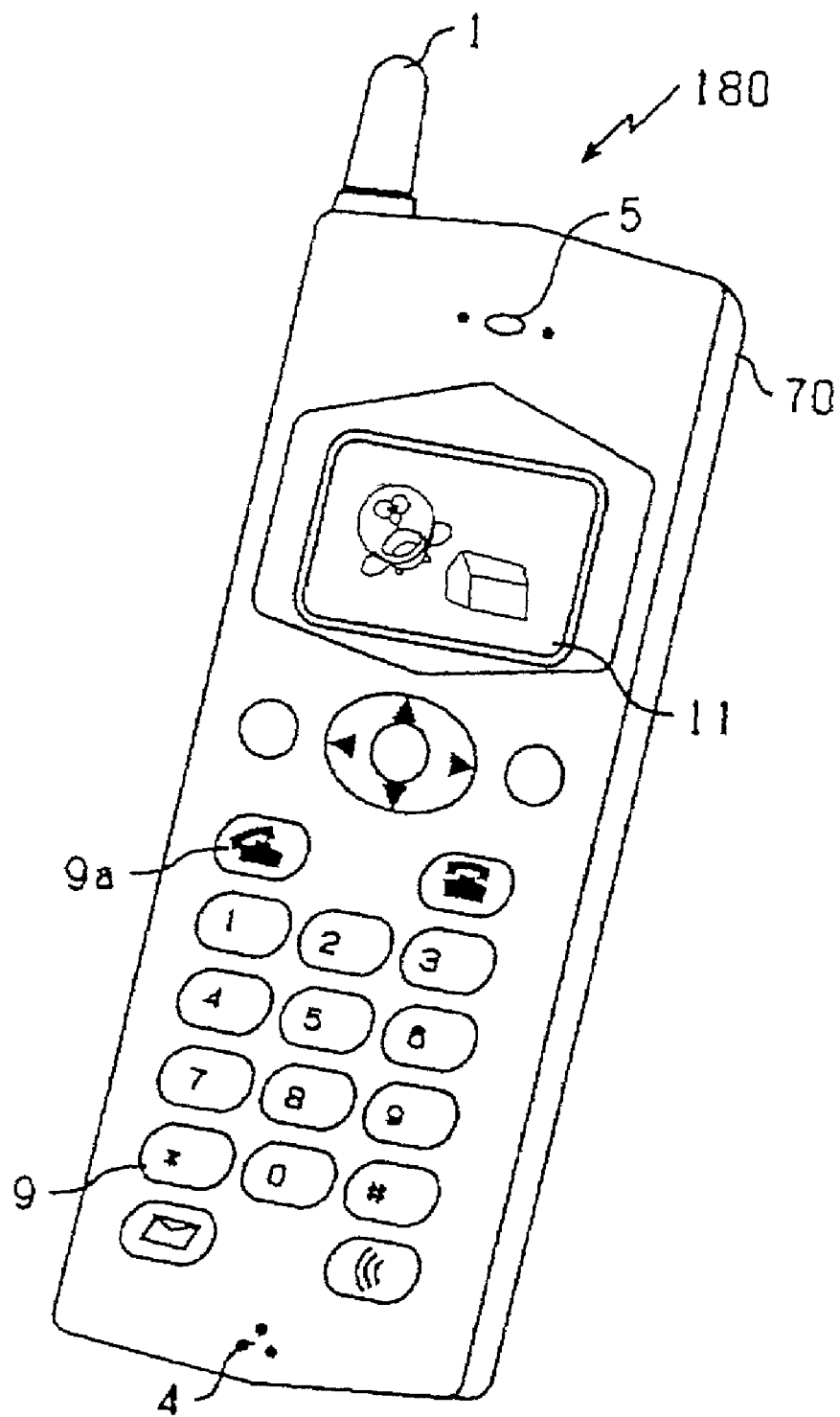
FIG. 28 is a perspective view of the portable telephone to which the lens adapter according to the ninth embodiment may be attached.

FIG. 28 illustrates the appearance of the portable telephone 180 to which the lens adapter 80 of this embodiment can be attached. The portable telephone 180 has the antenna 1, the speaker 5, the display unit 11, the operation buttons 9 including the talk button 9a, and the microphone 4. As shown in FIGS. 29 and 30, the lens adapter 80 is attached to the portable telephone 180 from upper portion thereof.

Figure 29:
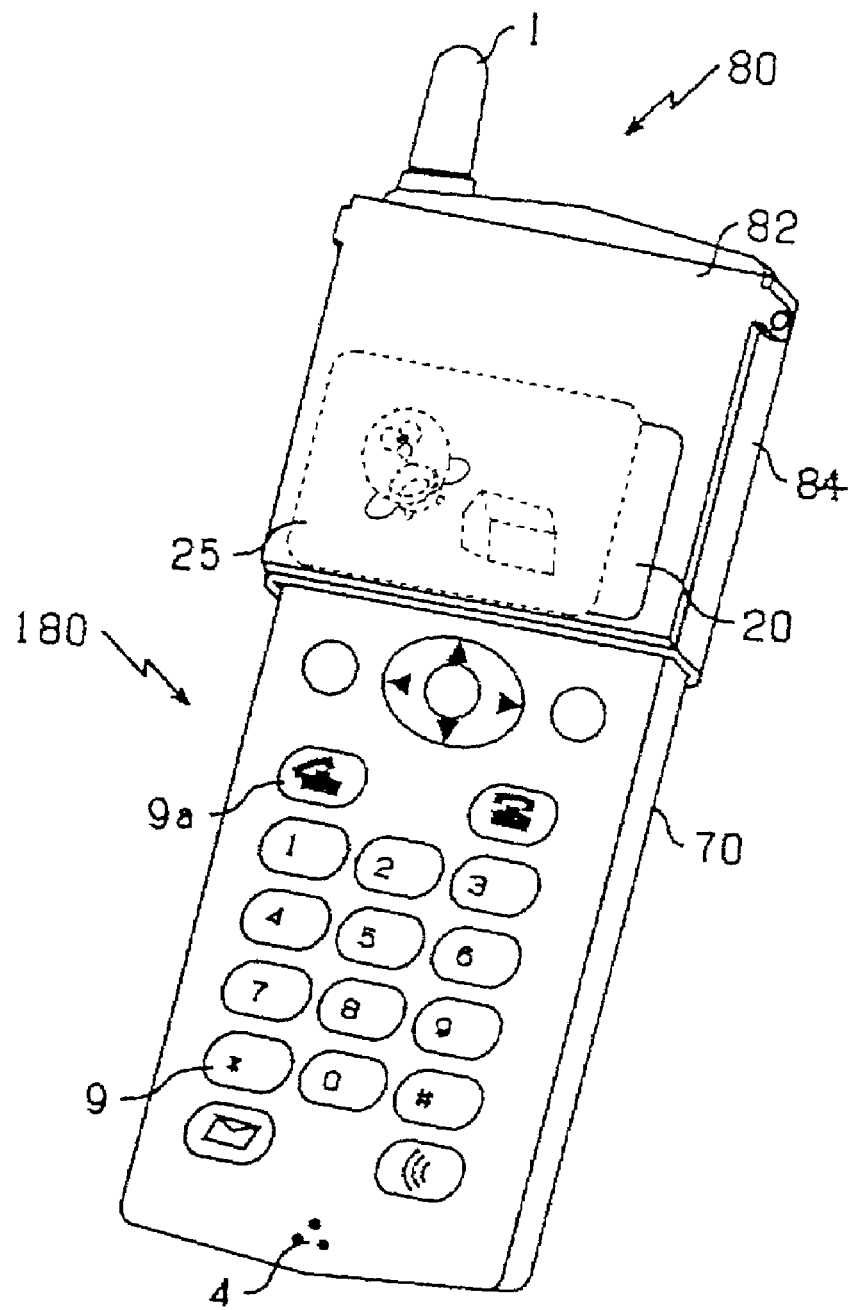
FIG. 29 is a perspective view of the portable telephone to which the lens adapter according to the ninth embodiment is attached and the panel unit of which is opened.
Figure 30:
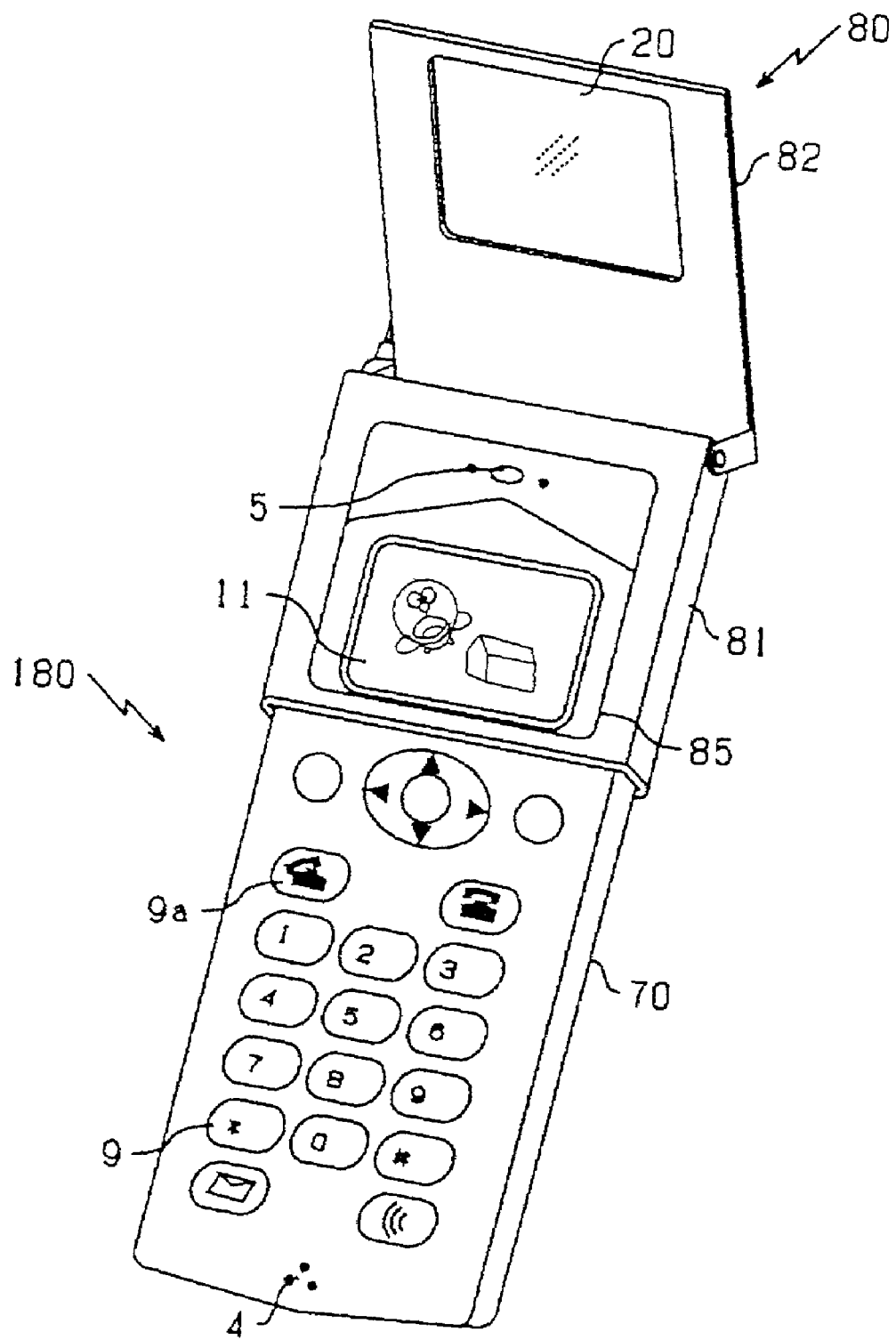
FIG. 30 is a perspective view of the portable telephone to which the lens adapter according to the ninth embodiment is attached and the panel unit of which is closed.

When the panel unit 82 is at the closed, first position (i.e., call waiting position) as shown in FIG. 29, the lens adapter 80 is located at the position remote from the display unit 11 by the focal length in parallel with the front face of the display unit 11, and thereby visualizes the character picture displayed on the display unit 11 at the imaginary image formation plane 25 as the pseudo-stereoscopic picture to give the user pleasure or enjoyable feeling at the time of the phone call.

On the other hand, when the panel unit 82 is located at the second position (in-use state) at which the panel unit 82 is opened as shown in FIG. 30, the lens adapter 80 exposes the display unit 11 and the speaker 5 of the portable telephone 180 by the opening window 85, thereby providing normal two-dimensional picture to the user.

In the above lens adapter 80, the microlens unit 20 is attached to the panel unit 82 which can be opened and closed. However, the microlens unit 20 may be attached into the opening window 85 of the attachment unit 84 so that the user can attach the lens adapter 80 to the portable telephone 180 only when he or she wants to see and enjoy the pseudo-stereoscopic picture.

The application of the present invention is not limited to the features described in the above embodiments. For example, while the above embodiments are directed to the application of the present invention to the portable telephone, the present invention may also be applied to a codeless telephone, a PHS telephone, a car telephone and other various communication terminal devices.

Further, while the microlens unit 20 is moved with respect to the display unit 11 by the movement of the sliding plate 62 in the sixth and seventh embodiments, the microlens unit 20 may be fixed to the call-waiting position and the display unit 11 may be vertically moved by the movement of the sliding plate 62.

According to the present invention, the two-dimensional picture displayed on the display unit may be visualized as the pseudo-stereoscopic picture, and hence the user may have pleasure or enjoyable feeling.

What is claimed is:

1. A lens adapter comprising:
    an attachment unit for detachably attaching the lens adapter to a communication terminal device having a display unit for displaying two-dimensional picture;
    an opening window formed on the attachment unit at a position confronting the display unit when the lens adapter is attached to the communication terminal device;
    a microlens unit including a pair of microlens arrays and positioned to confront the display unit with a spacing substantially equal to a focal length of the microlens unit when the lens adapter is attached to the communication terminal device; and
    a panel unit for supporting the microlens unit and attached to the attachment unit in a manner movable between a first position at which the microlens unit confronts the display unit and a second position at which the microlens unit does not confront the display unit.

2. A lens adapter according to claim 1, wherein the attachment unit has folded parts at both sides thereof, and the attachment unit is attached to the communication terminal device by the folded parts.

3. A lens adapter according to claim 1, the communication terminal device is received by the folded parts of the attachment unit when the lens adapter is attached to the communication terminal device.

4. A lens adapter according to claim 1, wherein the opening window exposes the display unit and a speaker of the communication terminal when the lens adapter is attached to the communication terminal device.

* * * * *